United States Patent
Ghosh et al.

(10) Patent No.: US 11,113,653 B2
(45) Date of Patent: Sep. 7, 2021

(54) ARTIFICIAL INTELLIGENCE AND MACHINE LEARNING BASED INCIDENT MANAGEMENT

(71) Applicant: ACCENTURE GLOBAL SOLUTIONS LIMITED, Dublin (IE)

(72) Inventors: Sankar Ghosh, Navi Mumbai (IN); Priyadarshi Sengupta, Kolkata (IN); Reshmi Nandy, Bangalore (IN); Amit Bisarya, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 299 days.

(21) Appl. No.: 16/232,881

(22) Filed: Dec. 26, 2018

(65) Prior Publication Data
US 2020/0210924 A1 Jul. 2, 2020

(51) Int. Cl.
*G06Q 10/06* (2012.01)
*G06N 5/04* (2006.01)
*G06K 9/62* (2006.01)
*G06N 20/00* (2019.01)

(52) U.S. Cl.
CPC ..... *G06Q 10/06393* (2013.01); *G06K 9/6259* (2013.01); *G06K 9/6267* (2013.01); *G06N 5/04* (2013.01); *G06N 20/00* (2019.01); *G06Q 10/067* (2013.01)

(58) Field of Classification Search
None
See application file for complete search history.

(56) References Cited

U.S. PATENT DOCUMENTS

| | | | |
|---|---|---|---|
| 8,311,863 B1 | 11/2012 | Kemp | |
| 8,930,178 B2 | 1/2015 | Pestian et al. | |
| 10,572,796 B2 * | 2/2020 | AlSaud | G06N 3/08 |
| 2008/0015871 A1 | 1/2008 | Eder | |
| 2008/0313008 A1 | 12/2008 | Lee et al. | |
| 2009/0210081 A1 * | 8/2009 | Sustaeta | H04L 67/125 700/99 |
| 2009/0276296 A1 | 11/2009 | Spriegel | |
| 2011/0071963 A1 * | 3/2011 | Piovesan | G06Q 10/00 706/11 |

(Continued)

*Primary Examiner* — Jamie H Austin
(74) *Attorney, Agent, or Firm* — Mannava & Kang, P.C.

(57) ABSTRACT

In some examples, artificial intelligence and machine learning based incident management may include analyzing incident data related to a plurality of incidents associated with organization operations of an organization to train and test a machine learning classification model. Based on mapping of the organization operations to associated organizational key performance indicators, a corpus may be generated and used to determine an organizational key performance indicator that is impacted by each incident. New incident data related to a further plurality of incidents may be ascertained, and specified organizational key performance indicators associated with further organizational operations may be determined. Based on the corpus and the trained machine learning classification model, an output that includes an organization operation impacted by an incident, and a specified organizational key performance indicator associated with the organizational operation may be determined, and used to control an operation of a system associated with the organization.

18 Claims, 27 Drawing Sheets

(56) References Cited

U.S. PATENT DOCUMENTS

| | | | | |
|---|---|---|---|---|
| 2012/0084400 | A1* | 4/2012 | Almadi | H04L 67/12 |
| | | | | 709/219 |
| 2013/0282641 | A1* | 10/2013 | Martin | G05B 9/02 |
| | | | | 706/47 |
| 2018/0332483 | A1* | 11/2018 | Yoon | H04W 16/18 |
| 2019/0034767 | A1* | 1/2019 | Sainani | G06N 5/025 |
| 2019/0095817 | A1* | 3/2019 | Ma | G06F 16/951 |
| 2019/0097909 | A1* | 3/2019 | Puri | H04L 43/16 |
| 2020/0034701 | A1* | 1/2020 | Ritter | G06N 3/0454 |
| 2020/0045049 | A1* | 2/2020 | Apostolopoulos | |
| | | | | H04L 63/1425 |
| 2020/0177731 | A1* | 6/2020 | Aly | H04M 3/5235 |
| 2020/0382361 | A1* | 12/2020 | Chandrasekhar | G06N 5/04 |

* cited by examiner

FIG. 3

| INCIDENTS | PRIORITY | STATUS REASON | DESCRIPTION | WORK AROUND | SOLUTION | SLA | ORGANIZATION AREA | IDENTIFIED ORGANIZATIONAL OPERATION- REMARK | IDENTIFIED ORGANIZATIONAL OPERATION | CONCATENATE | LABEL |
|---|---|---|---|---|---|---|---|---|---|---|---|
| 183999 | | Workaround provided | A database connection lost is causing loss of meter reads RCH84M8022 is the tool | | | AMI Operations | T&D - AMI | Interval Data Database | | Manage core operations and services Serve Metering | Manage core operations and services Serve Metering |
| 183991 | | 3XGC Closed | MW904_CBTSRC / SW failure | | | AMI Operations | T&D - AMI | Inadequate information | Meter Read Management | NA | NA |

300 → (table)
302 → (highlighted description)

| INCIDENTS | PRIORITY | STATUS REASON | DESCRIPTION | WORK AROUND | SOLUTION | SLA | ORGANIZATION AREA | IDENTIFIED ORGANIZATIONAL OPERATION-REMARK | IDENTIFIED ORGANIZATIONAL OPERATION | CONCATENATE | LABEL |
|---|---|---|---|---|---|---|---|---|---|---|---|
| 18399... | | Workaround Provided | a database connection tool is causing loss of interval data at on on the field | | | AMI Operations | R&D-AMI | Interval Data : Database Connection Lost | Meter Read Management | Manage core operations and services Serve Metering | Manage core operations and services Serve Metering |
| 18399... | | SNOC Closed | hPKANC SW Error notify installation failure | | | AMI Operations | R&D-AMI | inadequate information | | Manage core operations and services Serve N/A | Manage core operations and services Serve N/A |

400 ← (table)
402 ← (description highlight)

FIG. 4

| ORGANIZATION | ORGANIZATION FILENAME | Features (Input) | Label (Output) | Run Mode |
|---|---|---|---|---|
| Western Utilities | Western Utilities pre-processed data.csv | 1. Incident Number, 2. Description 3. Assignment group | ORGANIZATIONAL OPERATION, OR ORGANIZATIONAL KPI | Test/Update |

L3Process to KPI via Neo4J Knowledge Graph

1. Read rows from the Predicted Result file
   1.1 Find the values in the "Summary" fields
   1.2 Store those values into a list, these are either batch proc id or phrases
   1.3 Run a Cypher Match for KPIs on HPUM_Corpus using the entire list of 1.2
   1.3 Store the multiple KPIs returned by the Knowledge Graph base on the values (batch proc/phrases)
   1.4 Report the KPIs impacted by a given ticket based on the Predicted L3 and Neo4J Knowledge Graph

*FIG. 7E*

| INCIDENT# | AssignedGroup | INCIDENT DESCRIPTION | ORGANIZATION OPERATION PREDICTED |
|---|---|---|---|
| | | | |

FIG. 8

| Index | Assigned Group | Description | Incidents | ORGANIZATION OPERATION PREDICTED | Detected KPI |
|---|---|---|---|---|---|
| 1 | | | | | |
| 15 | Service Desk | a database connection host is causing loss of interval data at on on the April 9PK called by Steve Richards to check MP's Data after comms failure Location of the Incident HP | 72 | Metering | Meter Read Management |
| 9 | | | | | |
| 16 | Service Desk | NRN RTU Comm Fails and Control Failures reported by DOC Location of the incident NRN IT Asset | 5 | Real Time Operations Monitoring & Control | Application Management |
| 109 | | | | | |
| 17 | Service Desk | ROTS RTU weather station of temp sensors not working Location of the incident ROTS IT Asset | 10 | Real Time Operations Monitoring & Control | Manage Service Operations |
| 83 | | | | | |
| 33 | SCADA Station RTU | Microwave Link | 74 | Real Time Operations Monitoring & Control | Manage Service Operations |
| 60 | | | | | |
| | Service Desk | NBYARC NVARC | 54 | Real Time Operations Monitoring & Control | Manage Service Operations |
| 92 | | | | | |

 1000

ASCERTAIN, BY AT LEAST ONE HARDWARE PROCESSOR AND FOR A SPECIFIED TIME DURATION, INCIDENT DATA RELATED TO A PLURALITY OF INCIDENTS ASSOCIATED WITH ORGANIZATIONAL OPERATIONS OF AN ORGANIZATION
1802

PREPROCESS, BY THE AT LEAST ONE HARDWARE PROCESSOR, THE INCIDENT DATA TO REMOVE SPECIFIED FEATURES OF THE INCIDENT DATA
1804

ANALYZE, BY THE AT LEAST ONE HARDWARE PROCESSOR, THE PREPROCESSED INCIDENT DATA TO DETERMINE THE ORGANIZATION ASSOCIATED WITH THE PREPROCESSED INCIDENT DATA
1806

SEPARATE, BY THE AT LEAST ONE HARDWARE PROCESSOR, THE ANALYZED PREPROCESSED INCIDENT DATA INTO A FIRST PART THAT IS TO BE USED TO TRAIN A MACHINE LEARNING CLASSIFICATION MODEL, AND A SECOND PART THAT IS TO BE USED TO TEST THE TRAINED MACHINE LEARNING CLASSIFICATION MODEL
1808

TRAIN, BY THE AT LEAST ONE HARDWARE PROCESSOR AND BASED ON THE ANALYZED PREPROCESSED INCIDENT DATA FROM THE FIRST PART, THE MACHINE LEARNING CLASSIFICATION MODEL
1810

TEST, BY THE AT LEAST ONE HARDWARE PROCESSOR AND BASED ON THE ANALYZED PREPROCESSED INCIDENT DATA FROM THE SECOND PART, THE TRAINED MACHINE LEARNING CLASSIFICATION MODEL
1812

```
┌─────────────────────────────────────────────────────────────┐
│ ASCERTAIN, BY THE AT LEAST ONE HARDWARE PROCESSOR, FOR      │
│ ANOTHER SPECIFIED TIME DURATION, NEW INCIDENT DATA RELATED  │
│ TO A FURTHER PLURALITY OF INCIDENTS ASSOCIATED WITH FURTHER │
│ ORGANIZATIONAL OPERATIONS OF THE ORGANIZATION               │
│                          1814                               │
└─────────────────────────────────────────────────────────────┘
                              │
                              ▼
┌─────────────────────────────────────────────────────────────┐
│ DETERMINE, BY THE AT LEAST ONE HARDWARE PROCESSOR,          │
│ SPECIFIED ORGANIZATIONAL KEY PERFORMANCE INDICATORS         │
│ ASSOCIATED WITH THE FURTHER ORGANIZATIONAL OPERATIONS OF    │
│ THE ORGANIZATION                                            │
│                          1816                               │
└─────────────────────────────────────────────────────────────┘
                              │
                              ▼
┌─────────────────────────────────────────────────────────────┐
│ DETERMINE, BY THE AT LEAST ONE HARDWARE PROCESSOR, BASED    │
│ ON THE TRAINED MACHINE LEARNING CLASSIFICATION MODEL, AND   │
│ FROM THE FURTHER ORGANIZATIONAL OPERATIONS OF THE           │
│ ORGANIZATION, AN OUTPUT THAT INCLUDES A SPECIFIED           │
│ ORGANIZATIONAL KEY PERFORMANCE INDICATOR, FROM THE          │
│ SPECIFIED ORGANIZATION KEY PERFORMANCE INDICATORS,          │
│ IMPACTED BY AN INCIDENT OF THE FURTHER PLURALITY OF         │
│ INCIDENTS                                                   │
│                          1818                               │
└─────────────────────────────────────────────────────────────┘
                              │
                              ▼
┌─────────────────────────────────────────────────────────────┐
│ CONTROL, BY THE AT LEAST ONE HARDWARE PROCESSOR AND         │
│ BASED ON THE OUTPUT, AN OPERATION OF A SYSTEM ASSOCIATED    │
│ WITH THE IDENTIFIED ORGANIZATION                            │
│                          1820                               │
└─────────────────────────────────────────────────────────────┘
```

*FIG. 18 (CONT.)*

ARTIFICIAL INTELLIGENCE AND MACHINE LEARNING BASED INCIDENT MANAGEMENT

BACKGROUND

A variety of techniques may be used to manage incidents, such as work events for an organization. For example, incidents may be managed based on requirements set forth with respect to priority of completion. According to another example, incidents may be managed based on requirements set forth with respect to availability of personnel.

BRIEF DESCRIPTION OF DRAWINGS

Features of the present disclosure are illustrated by way of example and not limited in the following figures(s), in which like numerals indicate like elements, in which:

FIG. 3 illustrates incidents including special characters and outliers to illustrate operation of the artificial intelligence and machine learning based incident management apparatus of FIG. 1 in accordance with an example of the present disclosure;

FIG. 4 illustrates removal of special characters and outliers from the incidents of FIG. 3 to illustrate operation of the artificial intelligence and machine learning based incident management apparatus of FIG. 1 in accordance with an example of the present disclosure;

FIG. 5 illustrates training based on specific input fields from a dataset and an output for the artificial intelligence and machine learning based incident management apparatus of FIG. 1 in accordance with an example of the present disclosure;

FIG. 7C illustrates machine readable instructions for the logical map of FIG. 7B for the artificial intelligence and machine learning based incident management apparatus of FIG. 1 in accordance with an example of the present disclosure;

FIG. 7E illustrates KPI determination for the artificial intelligence and machine learning based incident management apparatus of FIG. 1 in accordance with an example of the present disclosure;

FIG. 8 illustrates fields for a prediction result file for the artificial intelligence and machine learning based incident management apparatus of FIG. 1 in accordance with an example of the present disclosure;

FIG. 10 illustrates key performance indicator (KPI) determination based on an organizational operation using the corpus for the artificial intelligence and machine learning based incident management apparatus of FIG. 1 in accordance with an example of the present disclosure;

FIG. 18 illustrates a flowchart of an example method for artificial intelligence and machine learning based incident management in accordance with an example of the present disclosure.

DETAILED DESCRIPTION

Figure 1:
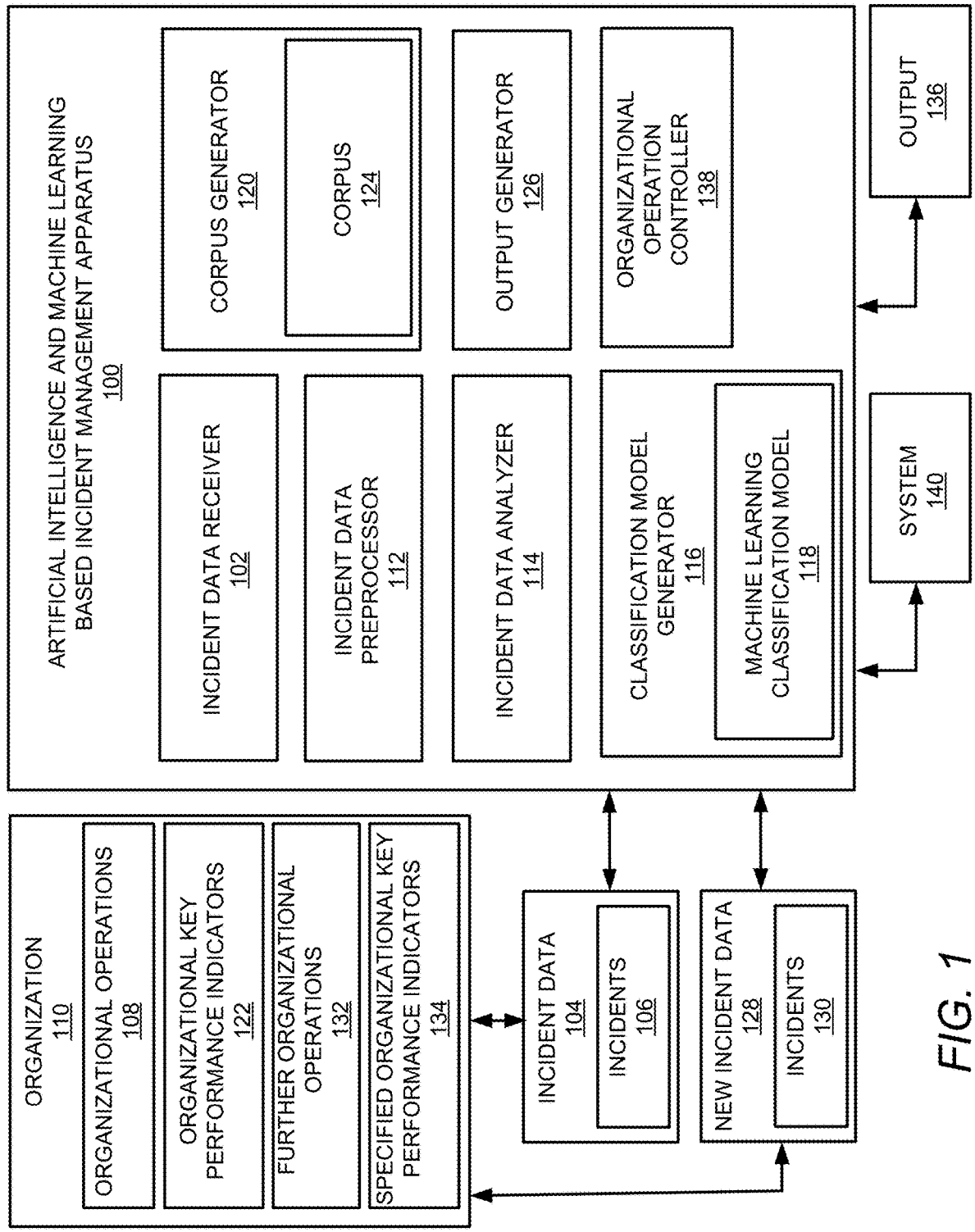
FIG. 1 illustrates a layout of an artificial intelligence and machine learning based incident management apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence and machine learning based incident management apparatuses, methods for artificial intelligence and machine learning based incident management, and non-transitory computer readable media having stored thereon machine readable instructions to provide artificial intelligence and machine learning based incident management are disclosed herein. The apparatuses, methods, and non-transitory computer readable media disclosed herein provide for artificial intelligence and machine learning based incident management by dynamically identifying which organizational operation is adversely impacted by different incidents (e.g., work events), and which specific critical organizational key performance indicators (KPIs) with respect to such an organizational operation are adversely impacted by such incidents. An incident may be described as a task that is to be performed. The apparatuses, methods, and non-transitory computer readable media disclosed herein provide for prioritization of incidents (or work events), such as information technology incidents that may be linked to critical organizational KPIs. In this regard, incidents may be prioritized, not only based on a number of users impacted or the specific underlying adverse impact on certain organizational transactions, but also based on critical organizational KPIs that are to be improved.

With respect to the apparatuses, methods, and non-transitory computer readable media disclosed herein, incidents (e.g., work events) may be classified based on a predefined set of rules related, for example, to a number of users impacted, underlying adverse impact on specific organizational transactions, etc. In this regard, it is technically challenging to determine the linkage between such incidents and critical organizational KPIs. For prioritization of incidents that may be based on static parameters (e.g., impacted specific organizational transaction) and the severity (e.g., number of users affected), it is likewise technically challenging to determine the linkage between such incidents and critical organizational KPIs.

The apparatuses, methods, and non-transitory computer readable media disclosed herein address at least the aforementioned technical challenges by classifying incidents for the impacted critical organizational KPIs based on key fields in data. The apparatuses, methods, and non-transitory computer readable media disclosed herein further address at least the aforementioned technical challenges by feeding a backlog of incidents (or tickets related to incidents), and generating a list of incidents that need to be prioritized to achieve improvements on a selected set of organizational KPIs. Further, the apparatuses, methods, and non-transitory computer readable media disclosed herein address at least the aforementioned technical challenges by applying tokenization (e.g., bag of words) and a knowledge graph to identify organizational operations and KPIs for a given set of incidents to determine metrics with respect to which incident has an impact on a KPI, and how the incidents should be prioritized in accordance with their KPI impact.

With respect to the apparatuses, methods, and non-transitory computer readable media disclosed herein, service level agreements may be used to measure performance of an incident. The service level agreements may be aligned, for example, to the priority of the incident, and while this arrangement may ensure that high priority (e.g., priority one and priority two) incidents get the attention they deserve, the associated technology may not be the driving organizational objective because the way prioritization occurs may not be linked to the KPIs that are critical to the organization. In this regard, the apparatuses, methods, and non-transitory computer readable media disclosed herein may identify incidents that affect critical organizational KPIs. The apparatuses, methods, and non-transitory computer readable media disclosed herein provide for the identification of the underlying organizational operation for every incident, and the seamless identification of, amongst these incidents, the few that have an impact on critical KPIs.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example artificial intelligence and machine learning based incident management apparatus (hereinafter also referred to as "apparatus 100").

Referring to FIG. 1, the apparatus 100 may include an incident data receiver 102 that is executed by at least one hardware processor (e.g., the hardware processor 1702 of FIG. 17, and/or the hardware processor 1904 of FIG. 19) to ascertain, for a specified time duration, incident data 104 related to a plurality of incidents 106 associated with organizational operations 108 of an organization 110. Examples and further details of incident data 104 are disclosed herein with respect to FIGS. 3 and 4.

An incident data preprocessor 112 that is executed by at least one hardware processor (e.g., the hardware processor 1702 of FIG. 17, and/or the hardware processor 1904 of FIG. 19) may preprocess the incident data 104 to remove specified features of the incident data 104.

According to examples disclosed herein, the incident data preprocessor 112 may remove the specified features that include specified characters, specified words, and/or specified phrases.

According to examples disclosed herein, the incident data preprocessor 112 may classify, based on a quality of the incident data, the incident data as mature or naïve. Further, based on the naïve classification of the incident data, the incident data preprocessor 112 may utilize deep learning to extract features from the incident data.

An incident data analyzer 114 that is executed by at least one hardware processor (e.g., the hardware processor 1702 of FIG. 17, and/or the hardware processor 1904 of FIG. 19) may analyze the preprocessed incident data to determine the organization 110 associated with the preprocessed incident data.

A classification model generator 116 that is executed by at least one hardware processor (e.g., the hardware processor 1702 of FIG. 17, and/or the hardware processor 1904 of FIG. 19) may separate (e.g., divide) the analyzed preprocessed incident data into a first part that is to be used to train a machine learning classification model 118, and a second part that is to be used to test the trained machine learning classification model 118. The classification model generator 116 may train, based on the analyzed preprocessed incident data from the first part, the machine learning classification model 118. Further, the classification model generator 116 may test, based on the analyzed preprocessed incident data from the second part, the trained machine learning classification model 118.

According to examples disclosed herein, the classification model generator 116 may determine, for the trained machine learning classification model 118, a precision score. Further, based on a determination that the precision score is less than a specified precision score threshold, the classification model generator 116 may iteratively train the machine learning model 118 until the precision score is greater than or equal to the specified precision score threshold.

A corpus generator 120 that is executed by at least one hardware processor (e.g., the hardware processor 1702 of FIG. 17, and/or the hardware processor 1904 of FIG. 19) may generate, based on mapping of the organizational operations 108 of the organization 110 to associated organizational key performance indicators 122, a corpus 124. According to examples disclosed herein, the corpus 124 may include a high performing utility model (HPUM) corpus. Further, for each incident of the plurality of incidents 106, the corpus generator 120 may determine, based on the corpus 124, an organizational key performance indicator that is impacted by the incident.

According to examples disclosed herein, the corpus generator 120 may utilize an ontology to map relationships between the organizational operations of the organization and the associated organizational key performance indicators. Further, the corpus generator 120 may generate, based on the mapping of the organizational operations of the organization to the associated organizational key performance indicators, the corpus 124.

An output generator 126 that is executed by at least one hardware processor (e.g., the hardware processor 1702 of FIG. 17, and/or the hardware processor 1904 of FIG. 19) may ascertain, for another specified time duration, new incident data 128 related to a further plurality of incidents 130 associated with further organizational operations 132 of the organization 110. Alternatively, the new incident data 128 may be related to a different organization compared to the organization for the incident data 104. According to examples disclosed herein, the specified time duration may be different from the another specified time duration. The output generator 126 may determine specified organizational key performance indicators 134 associated with the further organizational operations 132 of the organization 110. The output generator 126 may determine, based on the corpus 124 and the trained machine learning classification model 118, and from the further organizational operations 132 of the organization 110, an output 136 that includes (e.g., the first variant of the output 136 as disclosed herein) an organizational operation impacted by an incident of the further plurality of incidents 130 associated with the further organizational operations 132 of the organization 110, and a specified organizational key performance indicator, from the specified organization key performance indicators 134, associated with the organizational operation. Alternatively or additionally, the output 136 may include (e.g., the second variant of the output 136 as disclosed herein) a specified organizational key performance indicator, from the specified organization key performance indicators 134, impacted by an incident of the further plurality of incidents 130.

According to examples disclosed herein, the output generator 126 may determine a priority of each incident of the further plurality of incidents. Further, the output generator 126 may modify, based on the determined priority of each incident of the further plurality of incidents, the priority of the incident corresponding to the impacted organizational operation. For example, the output generator 126 may increase the priority of the incident corresponding to the impacted organizational operation.

An organizational operation controller 138 that is executed by at least one hardware processor (e.g., the hardware processor 1702 of FIG. 17, and/or the hardware processor 1904 of FIG. 19) may control, based on the output 136, an operation of a system 140 associated with the identified organization 110. For example, with respect to management of field requests as disclosed herein, some selected requests for field service transactions may be of importance to an organization (e.g., requests for certain emergency responses related to fixing of existing connections in the utilities industry). Incidents related to such requests may be missed within a relatively large number of incidents that are handled on a regular basis. In this regard, the output 136 that identifies an organizational operation impacted by an incident may provide for the identification of the urgency of the exact service requested. The prioritization may be achieved by reading the description of the emergency request, noting key words that highlight the necessity to process such field force requests quickly, and finally re-prioritizing such incidents to modify an existing connection in the utilities industry.

The output 136 may also provide a real time understanding of the information technology effort and cost an organization may be undertaking on the maintenance of a critical organizational process index.

The output 136 may further provide real time alerts indicating, for example, artificial intelligence led suggestions regarding rearrangement of the information technology effort cost, and management towards solving the key organizational problems rather than using the available information technology effort without any strategic benefits.

Operation of the components of FIG. 1 is described in further detail with reference to FIGS. 1-18.

As disclosed herein, the classification model generator 116 may train, based on the analyzed preprocessed incident data, the machine learning classification model 118. In this regard, the classification model generator 116 may implement statistical model-based machine learning to indicate which organizational operations have the highest potential to be affected due to an incident (e.g., a problem in an associated application). The accuracy of the results of the classification model generator 116 may correspond to the adequacy of description of incidents.

The apparatus 100 may bridge the gap, for example, between the focus of the incidents (e.g., information technology related to the application layer on which incidents are reported), and the focus of the organization (which is more on impacted organizational operations, and key performance indicators that are critical to the organization). The apparatus 100 may identify the underlying organizational operations that are affected by the incident reported at the application layer.

As disclosed herein, the output generator 126 may ascertain, for another specified time duration, new incident data 128 related to a further plurality of incidents 130 associated with further organizational operations 132 of the organization 110. In this regard, the output generator 126 may analyze feedback with respect to disparate incident sets to enrich the analysis based on the new datasets. This feedback analysis may result in a continuous enrichment and training process, thereby improving the ability of the machine learning classification model 118 to accurately perform predictions.

Figure 2:
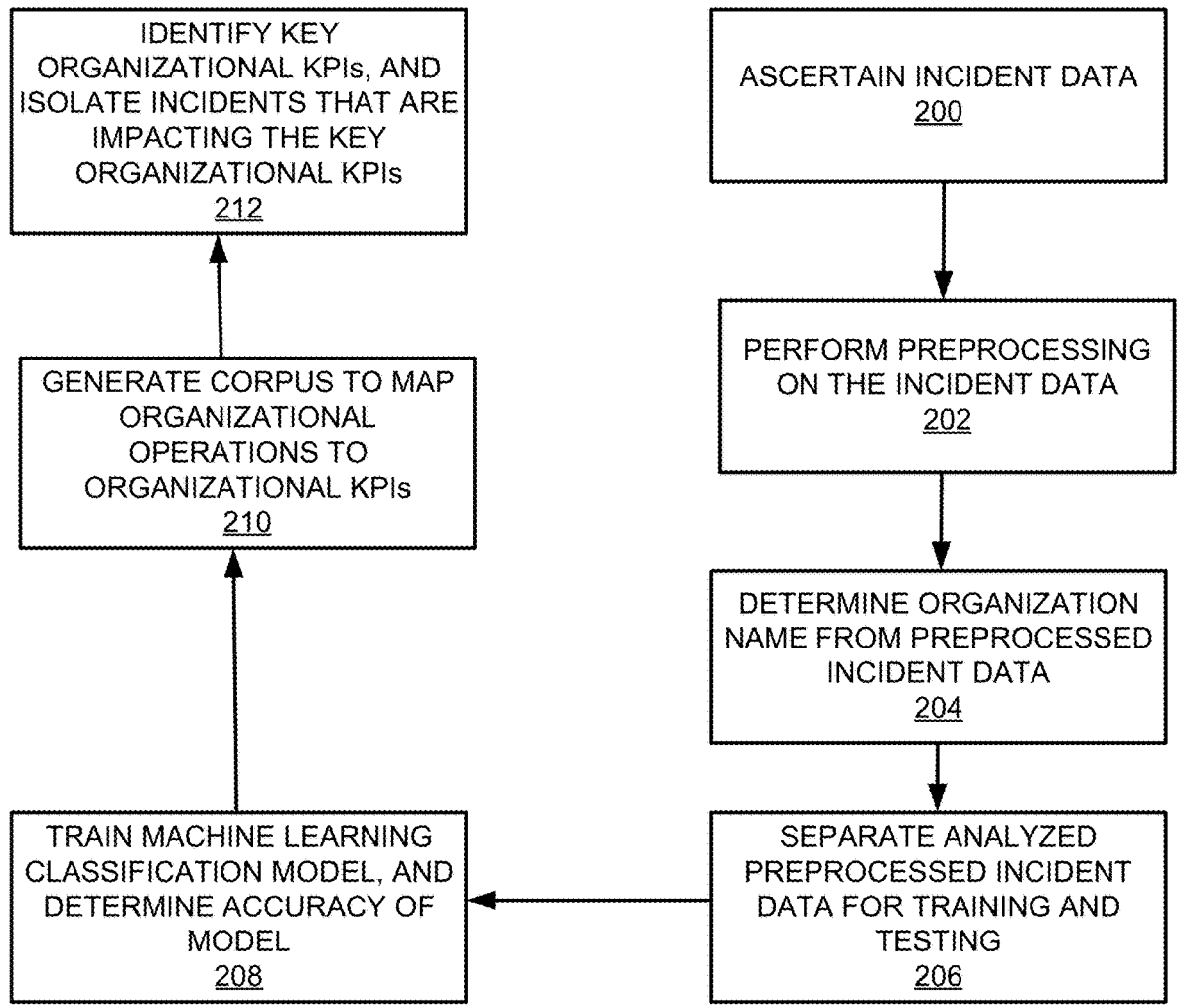
FIG. 2 illustrates a logical flow of the layout of the artificial intelligence and machine learning based incident management apparatus of FIG. 1 in accordance with an example of the present disclosure.

FIG. 2 illustrates a logical flow of the layout of the apparatus 100 in accordance with an example of the present disclosure.

Referring to FIG. 2, at block 200, the incident data receiver 102 may ascertain, for a specified time duration, incident data 104 related to a plurality of incidents 106 associated with organizational operations 108 of an organization 110. In this regard, the incident data receiver 102 may collate an incident-set that includes the incidents, for example, from an organization 110. The incident data 104 may be ascertained for a specified time frame (e.g., 6 months, 1 year, etc.), with the end objective of determining the output 136. For example, as the first variant of the output 136 as disclosed herein, the output 136 may include a prediction of an impacted organizational operation and an associated KPI by anchoring on the organizational operation. For the second variant of the output 136 as disclosed herein, the output 136 may include a prediction of an impacted KPI. Thus, for the first variant, the output 136 may include an impacted organizational operation, and for the second variant, the output 136 may include an impacted organizational KPI.

At block 202, the incident data preprocessor 112 may preprocess the incident data 104 to remove specified features of the incident data 104. In this regard, the incident data preprocessor 112 may analyze the labelled dataset to remove unwanted text (e.g., special characters, outliers, nulls, etc.) before performing statistical analysis. Blocks 204, 206, 208, 210, and 212 of FIG. 2 are explained below.

With respect to block 202, FIG. 3 illustrates a table 300 of incidents including special characters and outliers to illustrate operation of the apparatus 100 in accordance with an example of the present disclosure. FIG. 4 illustrates a table 400 including removal of special characters and outliers from the incidents of FIG. 3 to illustrate operation of the apparatus 100 in accordance with an example of the present disclosure.

Referring to FIG. 3, at 302, the table 300 shows the actual description of incidents containing special characters, outliers, etc. Further, at 402, the table 400 indicates how the special characters, outliers, etc., are removed upon performance of preprocessing.

With respect to data profiling and feature engineering, in order to ensure that appropriate feature engineering modules and/or schema are selected from the preprocessed dataset, the incident data preprocessor 112 may perform data profiling from the preprocessed dataset. The end outcome of this preprocessing may include classification of the maturity level of the incident set depending on the quality of the data, and the information technology infrastructure library (ITIL) proximity of incident data dump. Thus, with respect to feature engineering, and feature engineering modules and schema, different fields may be searched for person name and person email identification (e.g., patterns may be provided via a configuration file as this data changes across customer data). Different fields may be searched for information technology organization service group names (e.g., patterns may be provided via configuration file as this data may change across customer data). Different fields may be searched for any field with long text phrases. Different fields may be searched for any field that contains organization system generated "error code" or "status codes" (e.g., patterns may be provided via configuration file as this data changes across customer data). Different fields may be searched for any field with organization application names (e.g., patterns may be provided via configuration file as this data changes across customer data). Any fields meeting this criteria with respect to searching of different fields may be considered as a "feature".

The incident data preprocessor 112 may determine two types of classifications for a dataset.

The first type of classification may include ITIL novice, which may represent a classification that is applicable for those datasets where the maturity level of the dataset is low, the data is completely unstructured, and the data quality is poor.

The second type of classification may include ITIL mature, which may represent a classification that is applicable to those datasets where the maturity level of the dataset is high and the dataset includes a greater quality.

The determination of whether the dataset is ITIL mature or novice may provide for the accurate determination of the output 136, and thus the accurate determination of the appropriate impacted organizational operation and/or associated KPI.

With respect to a dataset that may be classified as ITIL mature, a different set of pre-identified fields may be utilized for feature engineering. In this regard, a feature model may identify the names for the fields which contain the incident description, assignment group name, and the incident numbers. With respect to feature engineering, feature engineering may be described as the process of using domain knowledge of the data to create features to implement machine learning techniques. In feature engineering, the feature data may change over time, and this change may affect the accuracy coefficient and the relevance of the features columns for a targeted artificial intelligence outcome. The change of data may be accounted for via a feedback loop (e.g., a component that may be used for long term learning from the data). Selection of features may include a direct correlation with the accuracy (e.g., if lower accuracy is achieved based on a set of feature columns being used (in this case ticket description, and the organization service group name) for a given customer data set, then additional fields such as date fields, etc., may be utilized until the accuracy meets a specified quality criterion. With respect to automated feature engineering, the exact logic of the automated feature engineering may be determined depending on the customer data structure and data quality.

With respect to a dataset that may be classified as ITIL novice, the incident data preprocessor 112 may apply deep learning using multiple non-linear processing units for feature extraction and transformation. In this regard, an N-Gram may be created around the target wordlist for each column with alphanumeric type. For an n-gram sequence, the items may include phonemes, syllables, letters, words or base pairs according to the application. According to an example, the chosen item may include words or set of words. The incident data preprocessor 112 may begin with a set of pre-existing text categories (e.g., target word lists for subject domains) for which there are reasonably sized samples. From these samples, the incident data preprocessor 112 may generate N gram frequency profiles with represent to each of the categories. When a new dataset that is classified as novice (e.g., having multiple fields) arrives for classification, the incident data preprocessor 112 may first determine its N-gram frequency profile. The counts may be sorted in the reverse order by number of occurrences. The incident data preprocessor 112 may then compare this profile against the profiles for each of the pre-existing field categories using, for example, a distance measure. The incident data preprocessor 112 may classify each field as belonging to the category having the smallest distance. In this manner, each column in the data set may be tagged to a pre-determined field category. Based on this categorization, the incident data preprocessor 112 may determine the feature fields to be used as input. The input fields may then be replaced as feature engineering fields using terminal text input.

At block 204, the incident data analyzer 114 may analyze the preprocessed incident data to determine the organization 110 associated with the preprocessed incident data. In this regard, the incident data analyzer 114 may perform feature engineering (e.g., modelling). The incident data analyzer 114 may feed the Naïve Bayes the features engineering (e.g., specific input fields from dataset) and the label (e.g., output 136) for training purposes.

The raw incident data that is provided may include multiple fields that are created to facilitate the resolution of incidents. Not all of these fields may be helpful in training the machine learning algorithm. In this regard, feature engineering may be used to identify a subset of these fields that will be relevant for the machine learning algorithm. Additionally, a label may be identified for each of these incidents for the dataset that is used for training. The label may not be available for the incidents for which the output is to be predicted. For the available incident dataset, the features and label identified above for each of the individual incidents may be fed to the Naïve Bayes algorithm, and using this input data, the Naïve Bayes algorithm may learn to predict the output for a given set of features.

FIG. 5 illustrates training based on specific input fields from a dataset and an output for the apparatus 100 in accordance with an example of the present disclosure.

Referring to FIG. 5, specific input fields from a dataset and an output 136 that are utilized for training purposes are shown at 500. For example, the fields may include organization, organization filename, features (input), label (output), and run mode.

With respect to the fields organization, organization filename, features (input), label (output), and run mode of FIG. 5, for the organization field, with respect to linkage to the output 136, the configuration file may be a single file containing configurable data for all different customers (or organizations). In this regard, configuration parameters specified in the other fields (or columns) may be ascertained against the organization name, and thus, these field values may act as an index to retrieve the values of the other fields. With respect to technical routing from input to output for the organization field, a Python library may search the file using a Python internal indexing mechanism.

For the organization filename, the name and location of the organizations service management ticket data dump may provide for linkage to the output 136. With respect to technical routing from input to output for the organization filename, a CSV or Excel sheet of data may be exported from the information technology organization system service management system.

For the features, the automatic feature searching module as disclosed herein may generate the output values which will be written to this field to provide for linkage to the output 136. With respect to additional inputs for the features, this may include a file which will be read/written by the applications along the different stages of the application execution path.

For the label (output), this field may include the target of the machine learning algorithm, and may represent the field that indicates what the machine learning algorithm should consider as "output" based on the "input" fields stated as "features", to thus provide for linkage to the output 136. With respect to additional inputs for the label (output), these additional inputs may be provided a subject matter expert.

For the run mode (test/update), this field may represent a technical parameter, and provide an indication of when execution is to be commenced for creating the machine learning algorithm model, and when to run for applying the already created machine learning algorithm to a new source of ticket data, to thus provide for linkage to the output 136. With respect to additional inputs for the run mode, an application may execute in an initial mode to determine the best fitting statistical model and increase the prediction accuracy. Thereafter, the application may be executed again to apply the already developed machine learning model to predict on new input data.

Each dataset processed through this routine may be distinct and disparate, and hence may include its own unique set of features that are most ideal for producing the optimum results. In this regard, a configuration file may be utilized, and may include key parameters, the list of features and labels as inputs defined in this file. In this regard, the list of features may represent inputs while the label may represent the output as disclosed herein.

While the label field is clear based on the variant selected (e.g., organizational KPI in case of direct KPI variant, or Level 3 (L3) operation in case of derivation using the corpus 124, where the L3 operation is related to the L1, L2, and L3 layers of a business process model (BPM)), the features to be used for modeling may need to be defined. Based on heuristics, the fields already established to impact the KPI identifications may include "assignment group" or an equivalent field that denotes the team assigned to resolve a ticket related to the incident, and "text" or the description that identifies the issue or problem. The assignment group field may indicate which organization unit has raised the ticket incident. The organization group name may be related to the L3 organizational operation, and may represent a feature. In relatively large organizations, the organization system management groups may be segregated based, for example, on department names.

Other fields may also be available in the incident data dump, but some of these fields may be populated post resolution of the incidents, and these incidents may not be used because the output generator 126 may be invoked prior to resolution to prioritize the incidents. Such fields may be identified and excluded from the list of potential features.

Feature selection may be performed in a variety of manners, for example, by using linear models and regularization, using random forest regression, etc. These techniques may provide an understanding of the correlation of each feature to the output 136, and insight with respect to the features, their structure, and characteristics. Using coefficients of features in a regression model may also be utilized for selection, and combined with regularization to improve generalization. Using random forest models and "mean decrease impurity" and "mean decrease accuracy" may also provide for feature selection.

Given two features that are commonly occurring in datasets and which are confirmed to be always used, a Univariate analysis may be performed using F-tests to determine, for example, the top five features from the dataset. The top five fields may vary from one dataset to another. From within the multiple fields available in the incident dataset, an example may include:
1. Assignment group
2. Short description
3. Detailed description
4. Application Name/Module Name
5. Resolved by These selected fields may represent the features that are identified as part of feature engineering. If these already contain the assignment group and text fields, the other three may also be selected as the features. In case these tests do not show experiential fields, the top three features may be selected. For example, the dataset may include a relatively long text description in addition to the short text, or it may include the actual name of the resolver, or the application name or organizational department impacted. All or some of these components may represent meaningful fields to generate improved prediction from the trained machine learning classification model 118 as disclosed herein. The number of features may be limited to five features to be used for the analysis to avoid overfitting. With respect to experiential fields, of the possible relevant fields, "Assignment Group" and "Short Description" are fields that may be identified from experience to be available in all datasets and hence are confirmed to be used as features. Assignment group may specify the team that resolves the incident and may represent a strong identifier for the organizational process that is impacted by the incident. Short description may include the text describing the incident, and may be used to correlate what organizational process is impacted.

Once the features are identified, the identified features may be fed into the configuration file, and further processing may be performed, for example, by using the Naïve Bayes machine learning classification model 118.

At 206, the classification model generator 116 may separate the analyzed preprocessed incident data into a first part that is to be used to train a machine learning classification model 118, and a second part that is to be used to test the trained machine learning classification model 118. For example, the classification model generator 116 may separate the complete incident set into training data that includes, for example, approximately 75% of the incidents, while the balance 25% of data may be used for testing the trained machine learning classification model 118.

At 208, the classification model generator 116 may be executed to first train the machine learning classification model 118, and then test the trained machine learning classification model 118 by predicting organizational operations from large incident sets. In this regard, the classification model generator 116 may train the machine learning classification model 118, and then apply the trained machine learning classification model 118 for predicting the organizational KPI or the output organizational operation for the test dataset.

With respect to the aforementioned steps (e.g., blocks 202-208) that utilize feature engineering, training data, and testing data for refining the artificial intelligence of the machine learning classification model 118, these steps may represent iterative steps that may be repeated until a satisfactory precision score is ascertained. In this regard, as more volume is accumulated, data accuracy may increase through different cycles. Thus, as data quality increases, accuracy may also increase through different cycles.

The aforementioned steps (e.g., blocks 202-208) may be common to both the variants of the output 136 as disclosed herein.

At 210, the corpus generator 120 may generate a corpus, such as an HPUM corpus, to map an organizational operation to organizational KPIs. This process may be utilized for the first variant of the output 136 for determining the organizational KPI from the predicted organizational operation. Further, the corpus and the identified organizational operation may be merged to identify the impacted organizational KPI from the incident. For the second variant of the output 136, the processing at block 210 may not be needed as the output generator 126 may directly predict the organizational KPI without anchoring on the organizational operation for the second variant.

Referring again to block 204, if only the organizational operation is labeled, a common dialect corpus may include the probability to determine the organizational KPI(s), where the corpus may be denoted an HPUM corpus. This model may include the possibility to translate incident data to corpus readable language (e.g., token). The KPI may then be derived by combining the underlying organizational operation identified, and corpus tokens. Corpus tokens may represent dynamic content. For example, the "HPUM Token" (related tags) field may continue to change across different organizations and different discoveries. For example, a given organization may store a SAP application name in the ticket description whereas another organization may retain a business process name. This file may represent a one-time modification work for a given organization. In the following example, the batch job identification which is responsible for EMV card transactions may be determined. The application logic may be responsible for searching batch programs. If not found, text analysis may be performed to read the phrase and identify the relevant organization process names. For example, for an L3 organization process that includes metering, KPIs may include missing meter data, and related tags may include <Batch Program id/Name> and/or Phrases (e.g. WEB READ METER READ NOT MATCHING NOT UPLOADED). According to other examples, L3 organization processes may include metering, metering, billing, and billing, and KPIs may respectively include aged instrument, erroneous estimation, billing accuracy, and unbilled revenues. According to another example, L3 organization process may include payment, KPI may include direct debit accuracy, and related tag may include card processing <Batch Job> Failure.

Figure 6:
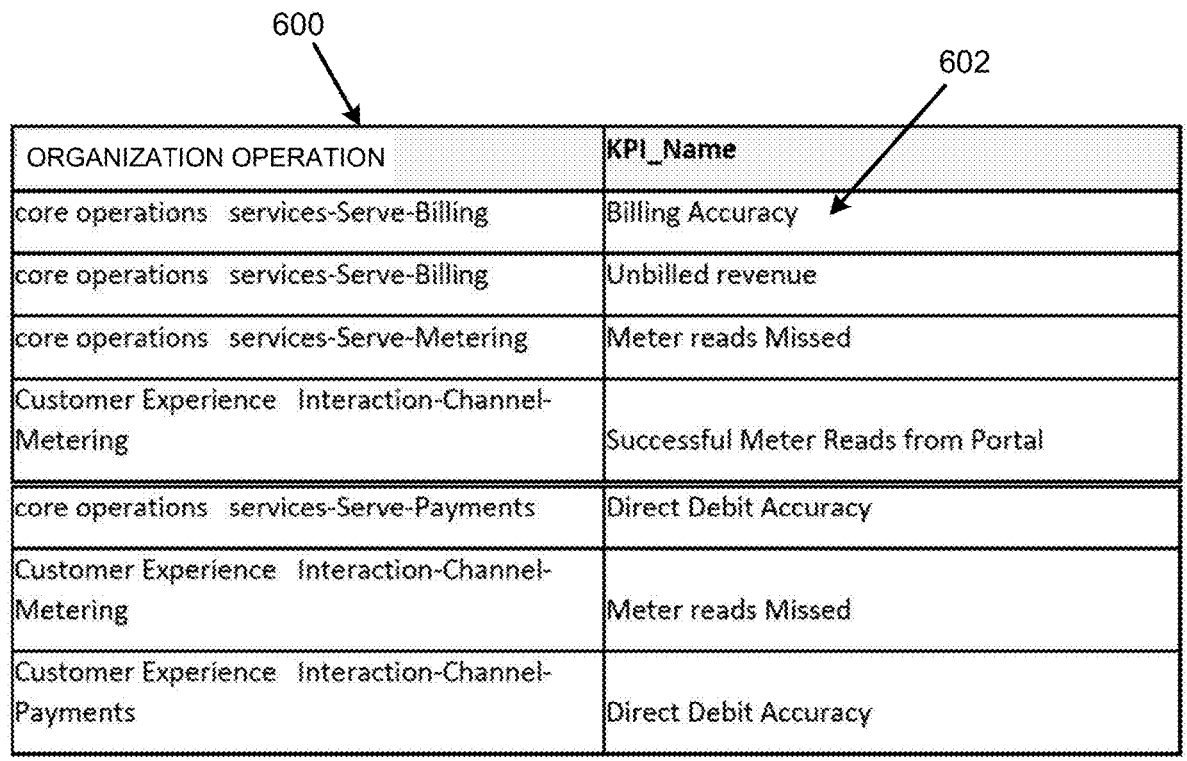
FIG. 6 illustrates organization operations and key performance indicators to illustrate operation of the artificial intelligence and machine learning based incident management apparatus of FIG. 1 in accordance with an example of the present disclosure.

FIG. 6 illustrates organization operations and key performance indicators to illustrate operation of the apparatus 100 in accordance with an example of the present disclosure.

Referring to FIG. 6, a sample table 600 showing the mapping between organizational operation and organizational KPI as part of the corpus 124 is shown. This corpus may be extended to any specific industry segment. For example, the corpus 124 may include fields organization operation, and KPI name. According to an example, entries for the organization operation fields may include, at 602, core operations services-served-billing, with the corresponding KPI name being billing accuracy, etc.

Figure 7A:
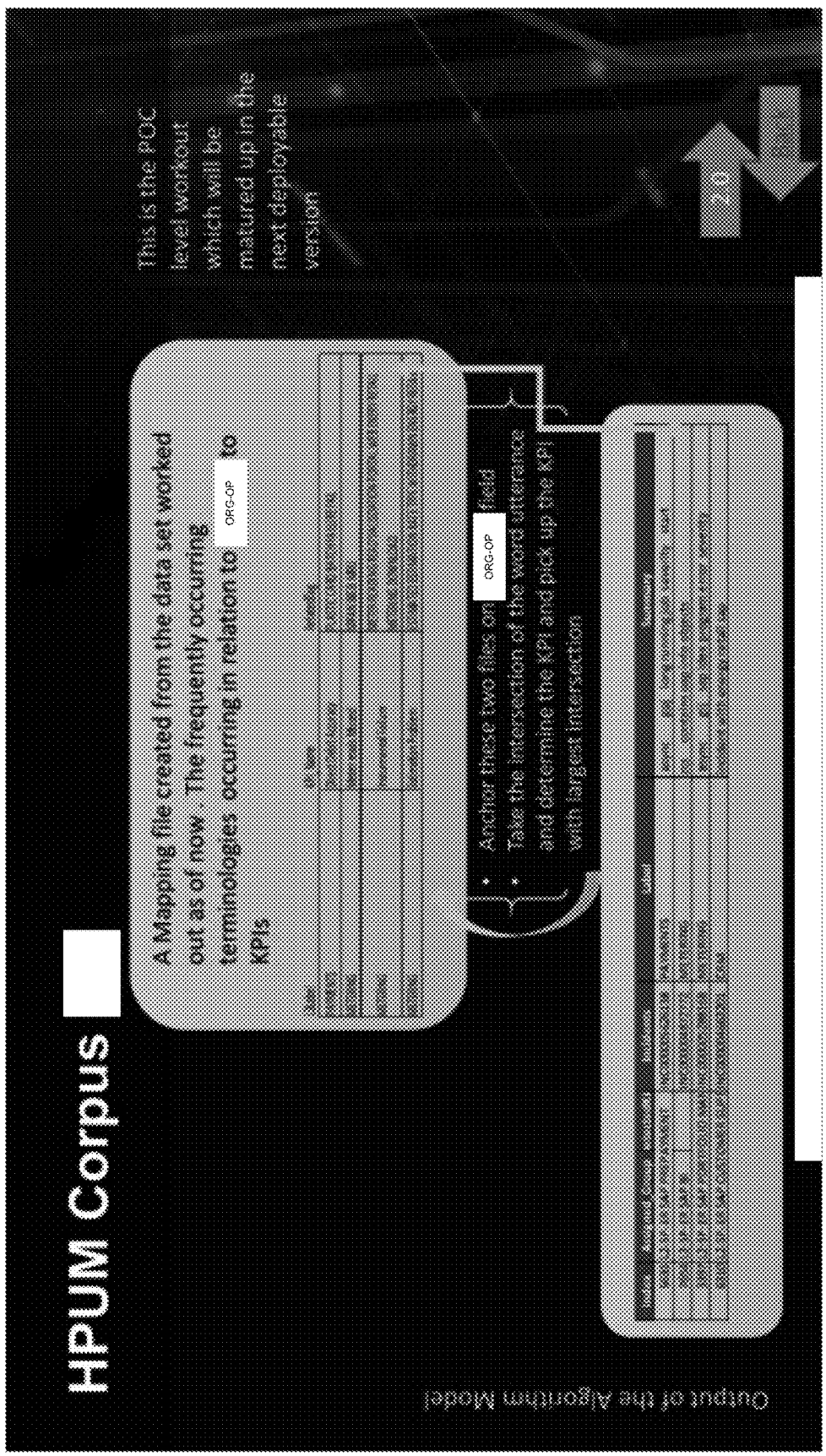
FIG. 7A illustrates implementation of a high performance utility model (HPUM) corpus for the artificial intelligence and machine learning based incident management apparatus of FIG. 1 in accordance with an example of the present disclosure.

FIG. 7A illustrates implementation of the HPUM corpus for the apparatus 100 in accordance with an example of the present disclosure.

Referring to FIG. 7A, the corpus 124, which may include an HPUM corpus, may utilize a text analysis based methodology to match commonly occurring keywords when an organizational operation and a specific KPI association occurs.

According to examples disclosed herein, the corpus generator 120 may utilize an ontology to map relationships between the organizational operations of the organization and the associated organizational key performance indicators. In this regard, the next step may include taking the text analysis to ontological analysis to model the different organizational operations (e.g., nouns) and KPIs (e.g., nouns) via relationships (e.g., verbs). This aspect may utilize domain language ontology via Neo4J graphDB. This implementation may be performed using, for example, a knowledge graph technology.

Figure 7B:
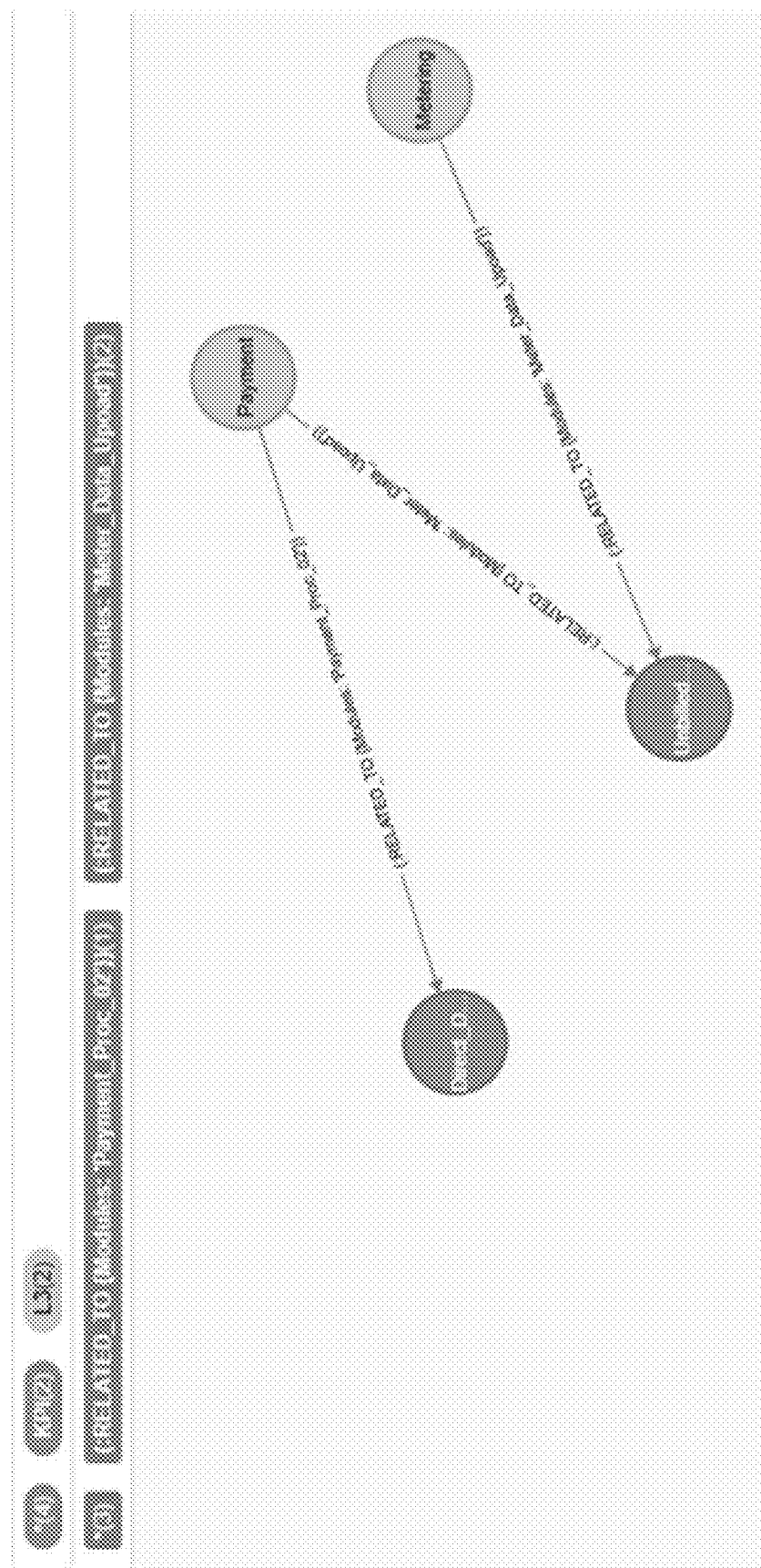
FIG. 7B illustrates a logical map for the artificial intelligence and machine learning based incident management apparatus of FIG. 1 in accordance with an example of the present disclosure.
Figure 7C:
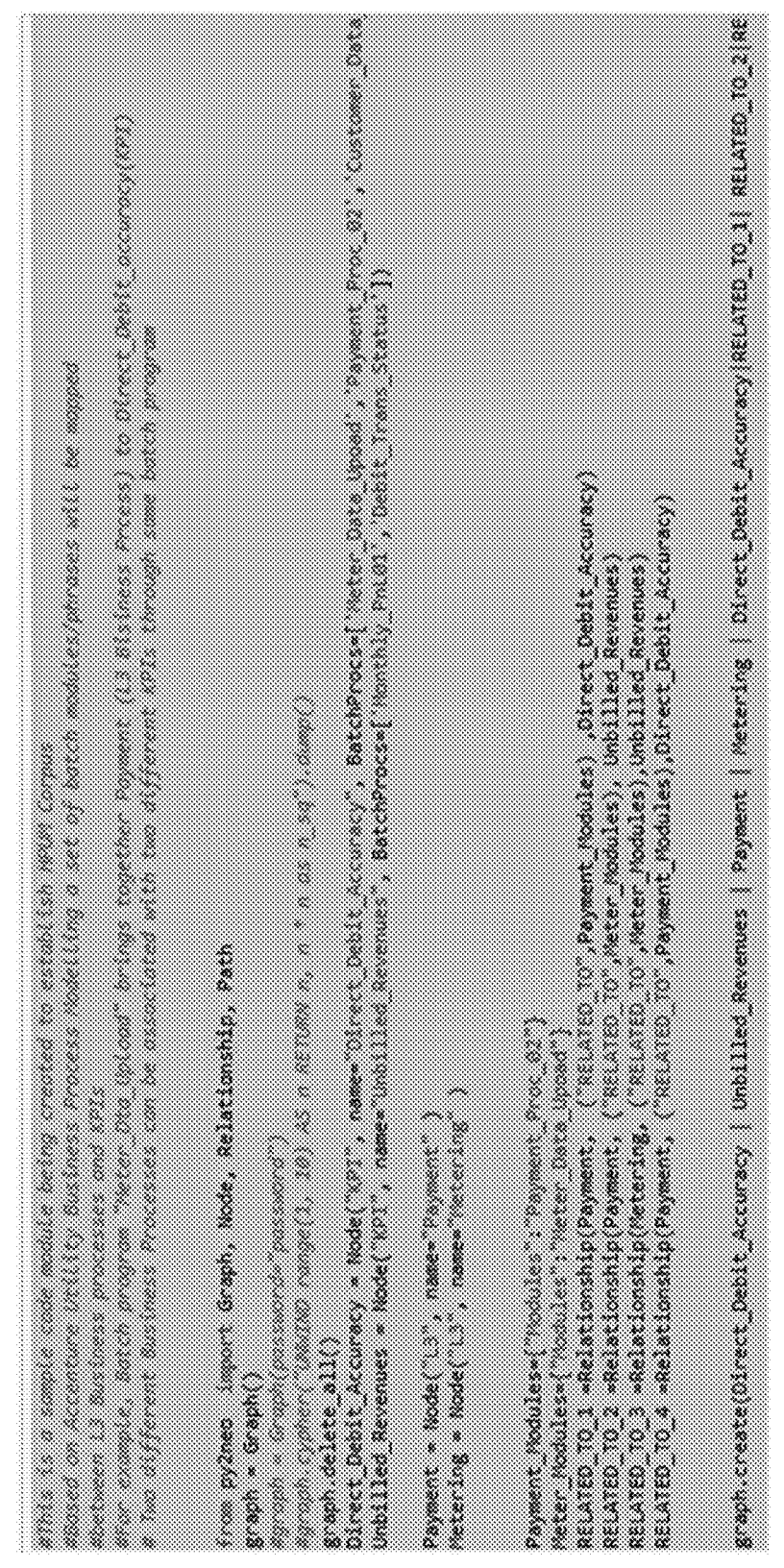
Figure 7D:
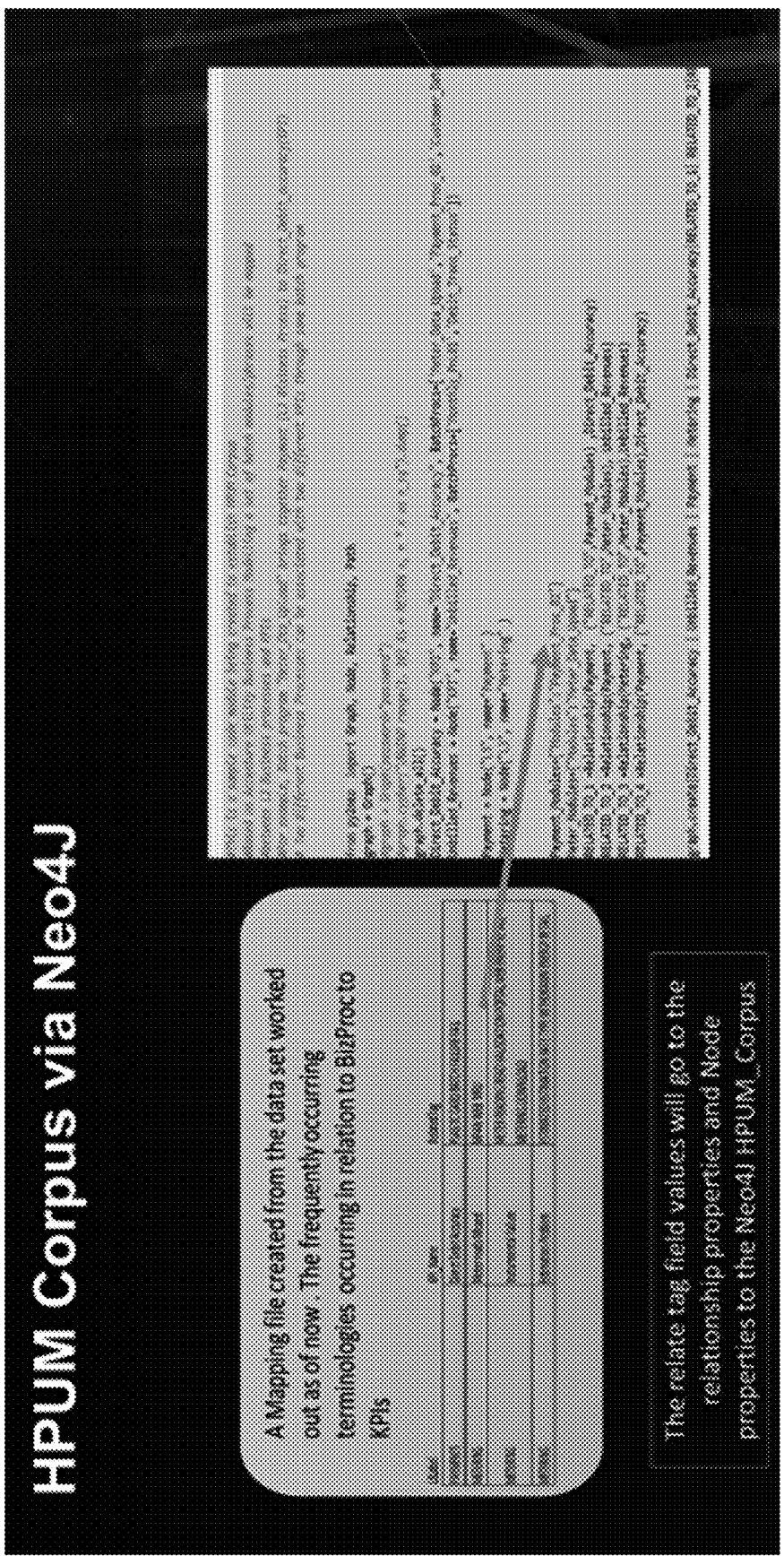
FIG. 7D illustrates an HPUM corpus for the machine readable instructions of FIG. 7C for the artificial intelligence and machine learning based incident management apparatus of FIG. 1 in accordance with an example of the present disclosure.

In this methodology, a subject matter expert may select a noun verb ontology available in the incident data dump, and create a logical map shown in FIG. 7B. In this regard, FIG. 7C illustrates machine readable instructions for the logical map of FIG. 7B, FIG. 7D illustrates an HPUM corpus for the machine readable instructions of FIG. 7C, and FIG. 7E illustrates KPI determination.

New data may undergo limited transformation to facilitate the labelling process gradually, and with reference to the GraphDB.

FIG. 8 illustrates fields for a prediction result file for the apparatus 100 in accordance with an example of the present disclosure.

Referring to FIG. 8, following the algorithmic prediction, for each organizational operation, a round of data remodeling may be performed from the prediction result file written to the disk as a .csv file with the fields shown in FIG. 8.

Thereafter, the 'incident description' of the prediction file may be used as Organizational_Operation_Predicted using a JSon mapper. With respect to the Organizational_Process_Predicted, attributes may include {Phrases (to be populated with the individual words found in the incident description)}. For the corpus 124 that may be developed ahead of this step, the corpus 124 may represent reference data in the current application and include its separate development lifecycle.

Based on the corpus 124 data model, a Predicted_Result.CSV file may be searched to determine the highest strength relationship between an Organizational_Process and KPI based on the phrase attribute using cypher query language.

With respect to the aforementioned process to determine the output 136, the process may be utilized for N:N relationships between incident data row and organizational operations. In this regard, one incident data row may be associated with CRM/PAYMENT/BILLING, etc. A rule may be applied to break a tie, or to leave it as N:N, depending on the context requirements.

When using ITIL, a user may be more likely to retain some key information in the incident data dump (e.g., application name, system engineer, or group name, etc.). Thus, a greater availability of data may result in a greater maturity of the GraphDB.

At 212, the output generator 126 may generate the output 136 to identify critical organizational KPIs, and may further use the trained machine learning classification model 118 to identify incidents impacting such critical organizational KPIs. In this regard, key organizational KPIs may be identified, and the output generator 126 may be executed for new incidents related to another specific time period. Further, the output generator 126 may isolate incidents which are impacting the key organizational KPIs from the new incidents, and prioritize resolution of these new incidents. In this regard, prioritization of resolution may be limited to isolated incidents impacting key organizational KPIs instead of the new incidents.

Thus, once the machine learning classification model 118 is trained (e.g., based on accuracy and overlaps (precision, recall, and f1-score) results)), the machine learning classification model 118 may be used to analyze further new data, divide the data into training data for a subset of the data, and then use the machine learning classification model 118 to confidently predict for the most affected critical KPIs for a given set of incidents. Precision may be described as the ratio of correctly predicted positive observations to the total predicted positive observations. Recall may be described as the ratio of correctly predicted positive observations to all observations. Further, the f1-score may be described as the weighted average of precision and recall.

Figure 9:
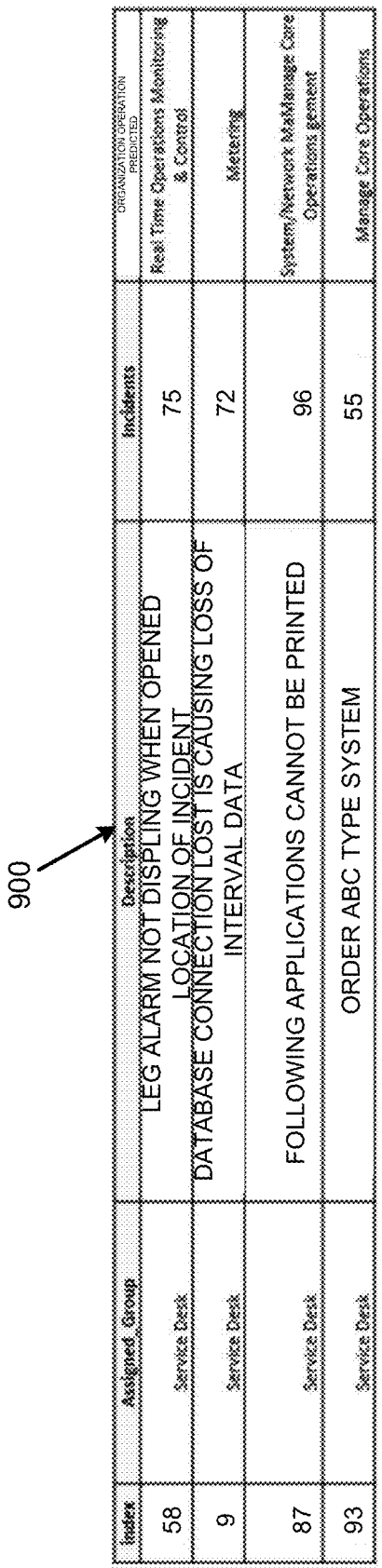
FIG. 9 illustrates a predicted organization operation for some sample incidents using a trained machine learning classification model for the artificial intelligence and machine learning based incident management apparatus of FIG. 1 in accordance with an example of the present disclosure.

FIG. 9 illustrates a predicted organization operation for some sample incidents using a trained machine learning classification model for the apparatus 100 in accordance with an example of the present disclosure. FIG. 10 illustrates KPI determination based on an organizational operation using the corpus for the apparatus 100 in accordance with an example of the present disclosure.

Referring to FIGS. 9 and 10, the tables at 900 and 1000 may respectively depict the results of the first variant of the output 136 that includes a prediction of the organizational operation (e.g., at 900), and then determination of the impacted organizational KPI from the predicted organizational operation (e.g., at 1000). For the example of FIG. 9, the table at 900 may include features (assigned group, description, and incident number) used to predict the table (e.g., predicted organizational operation). Further, the table at 1000 may include mapping of the organizational KPI from the predicted organizational operation using the corpus 124.

Based on the output 136, incident priority may be changed with respect to incidents that impact critical organizational KPIs. Based on the change of the incident priority, the organizational operation controller 138 may control the operation of the system 140 (e.g., a hardware component such as a machine). With respect to changing of the incident priority, if an incident that has a lower priority but impacts a critical operational KPI is identified, the priority of the incident may need to be changed from a lower priority to a higher priority. For each run, the list of critical operational KPIs may be received as inputs to identify the incidents that are impacting these critical KPIs. The current priority of those incidents may then be evaluated, and if the current priority is low, such incidents may be flagged with a specific identification number. Such incidents (based on the identification number) may be collated in a table, and the content of that table may be displayed after suitable formatting in a dashboard. A decision may then be made as to whether to retain the proposed prioritization or intervene and make any necessary changes.

The apparatus 100 may further be implemented with respect to other use cases such as field force efficiency, asset health monitoring, critical asset identification, asset life prediction, fraud detection, etc. In this regard, according to examples disclosed herein, with respect to management of field requests, some selected requests for field service transactions may be of importance to an organization (e.g., requests for certain emergency responses related to fixing of existing connections in the utilities industry). Incidents related to such requests may be missed within a relatively large number of incidents that are handled on a regular basis. In this regard, the output 136 that identifies an organizational operation impacted by an incident may provide for the identification of the urgency of the exact service requested. The prioritization may be achieved by reading the description of the emergency request, noting key words that highlight the necessity to process such field force requests quickly, and finally re-prioritizing such incidents.

Figure 11:
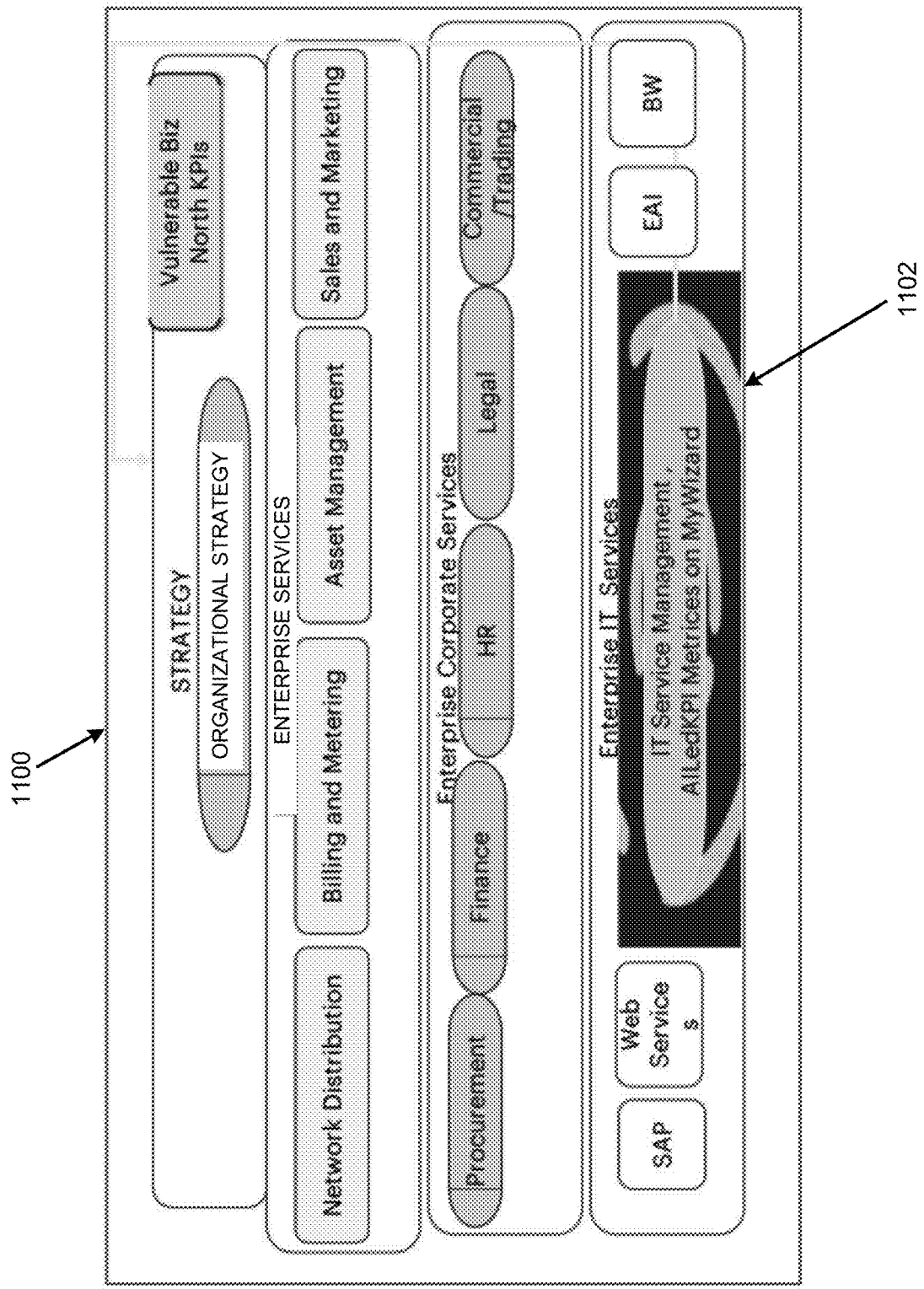
FIG. 11 illustrates service management layer integration of certain functionality of the artificial intelligence and machine learning based incident management apparatus of FIG. 1 in accordance with an example of the present disclosure.

FIG. 11 illustrates service management layer integration of certain functionality of the apparatus 100 in accordance with an example of the present disclosure.

Referring to FIG. 11, an organizational capability logical diagram 1100 is illustrated for a utility enterprise. In this regard, the apparatus 100 may provide an additional dimension of intelligence to the organizational strategy from services such as information technology services. The information technology services may be distributed across all of the different organizational functions. Certain functionalities of the apparatus 100 may be located at 1102 on the top of service management layer as a part of myWizard intelligence tools repertoire (and other such tools). For example, functionalities provided by the output generator 126 and/or the organizational operation controller 138 may be located at 1102 on the top of service management layer.

Figure 12:
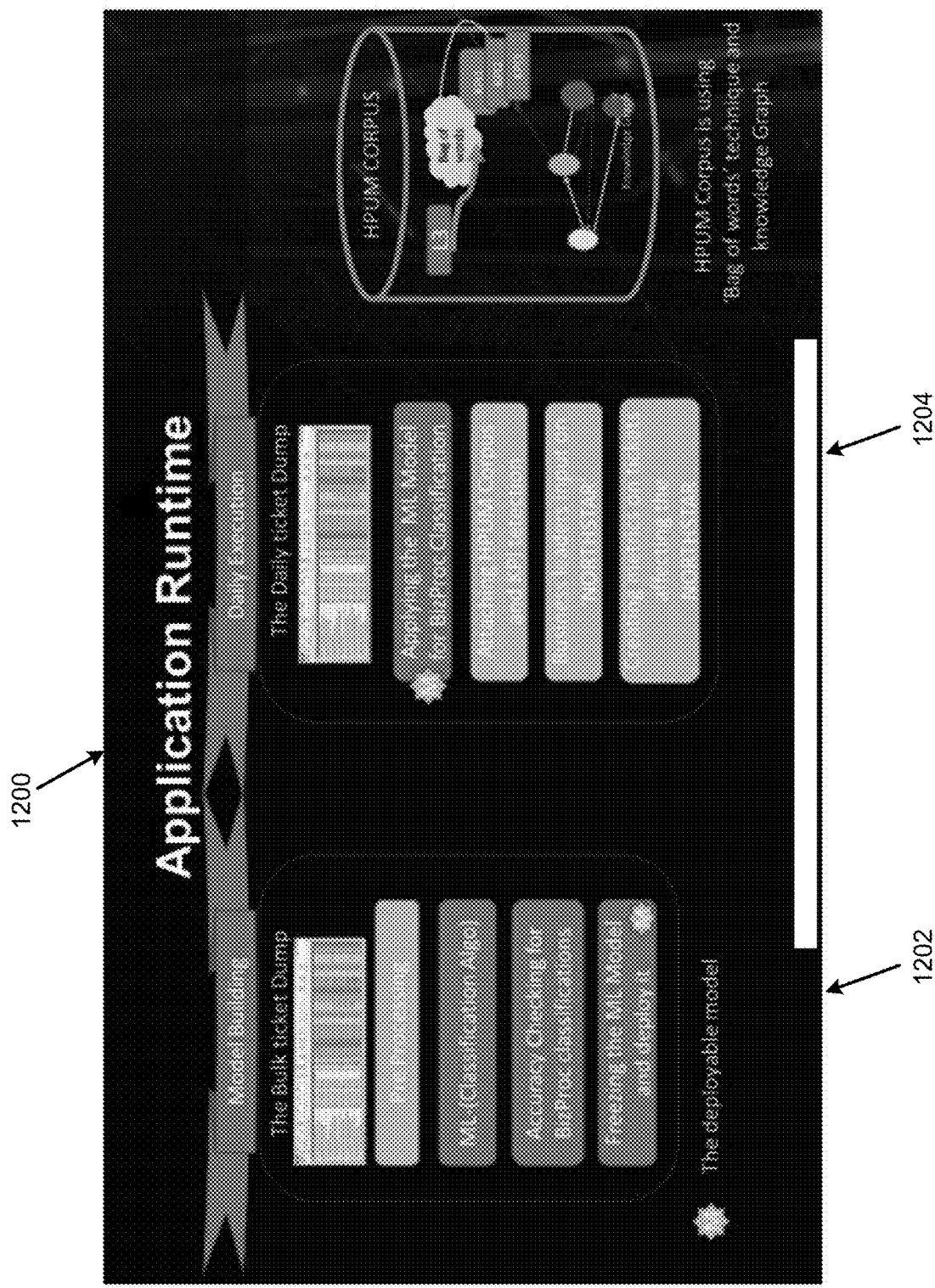
FIG. 12 illustrates a runtime display of certain functionality of the artificial intelligence and machine learning based incident management apparatus of FIG. 1 in accordance with an example of the present disclosure.

FIG. 12 illustrates a runtime display of certain functionality of the apparatus 100 in accordance with an example of the present disclosure.

Referring to FIG. 12, the application run time display 1200 may include building of the machine learning classification model 118 at 1202, and deployment of the machine learning classification model 118. At 1204, the machine learning classification model 118 may be implemented, for example, on daily data that is ascertained in conjunction with the corpus 124.

With respect to utilization of the corpus 124, a subject matter expert may decide on the organizational operation at the modeling phase with respect to training of the machine learning classification model 118, and the corpus 124 may be used to navigate from organizational operation to KPIs.

Alternatively, with respect to utilization of the corpus 124, the corpus 124 may be applied on the incident data during the preprocessing phase to identify the KPIs from the incident data.

Figure 13:
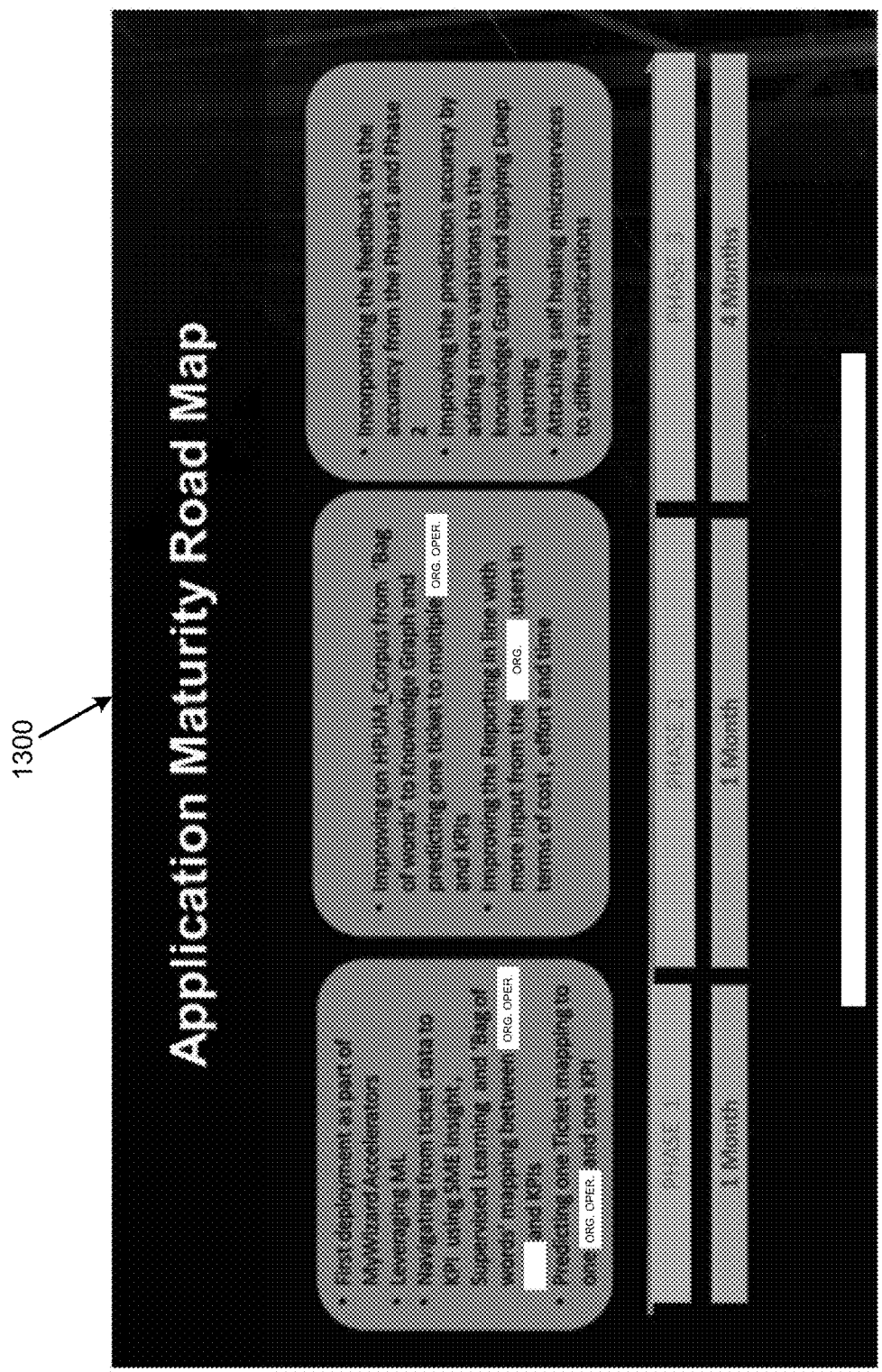
FIG. 13 illustrates an application life cycle of certain functionality of the artificial intelligence and machine learning based incident management apparatus of FIG. 1 in accordance with an example of the present disclosure.

FIG. 13 illustrates an application life cycle 1300 of certain functionality of the apparatus 100 in accordance with an example of the present disclosure.

Referring to FIG. 13, the application life cycle 1300 may include an example of deployment of the apparatus 100 for a period of six months. In this regard, each of the phases (e.g., phase 1, phase 2, and phase 3) may represent different phases of operation of the apparatus 100. For example, for phase 1, the application lifecycle 1300 may include deployment, leveraging of machine learning with respect to the machine learning classification model 118, navigation from incident data to KPI, and prediction of an incident mapping to one organizational operation and one KPI. For phase 2, the application lifecycle 1300 may include improvement of the corpus 124 from "bag of words" to knowledge graph, and prediction of one incident to multiple organizational operations and KPIs. For phase 3, the application lifecycle 1300 may include incorporation of the feedback on the accuracy from phase 1 and phase 2, improvement of the prediction accuracy by adding more variations to the knowledge graph and applying deep learning, and attachment of self-healing micro services to different applications.

Figure 14:
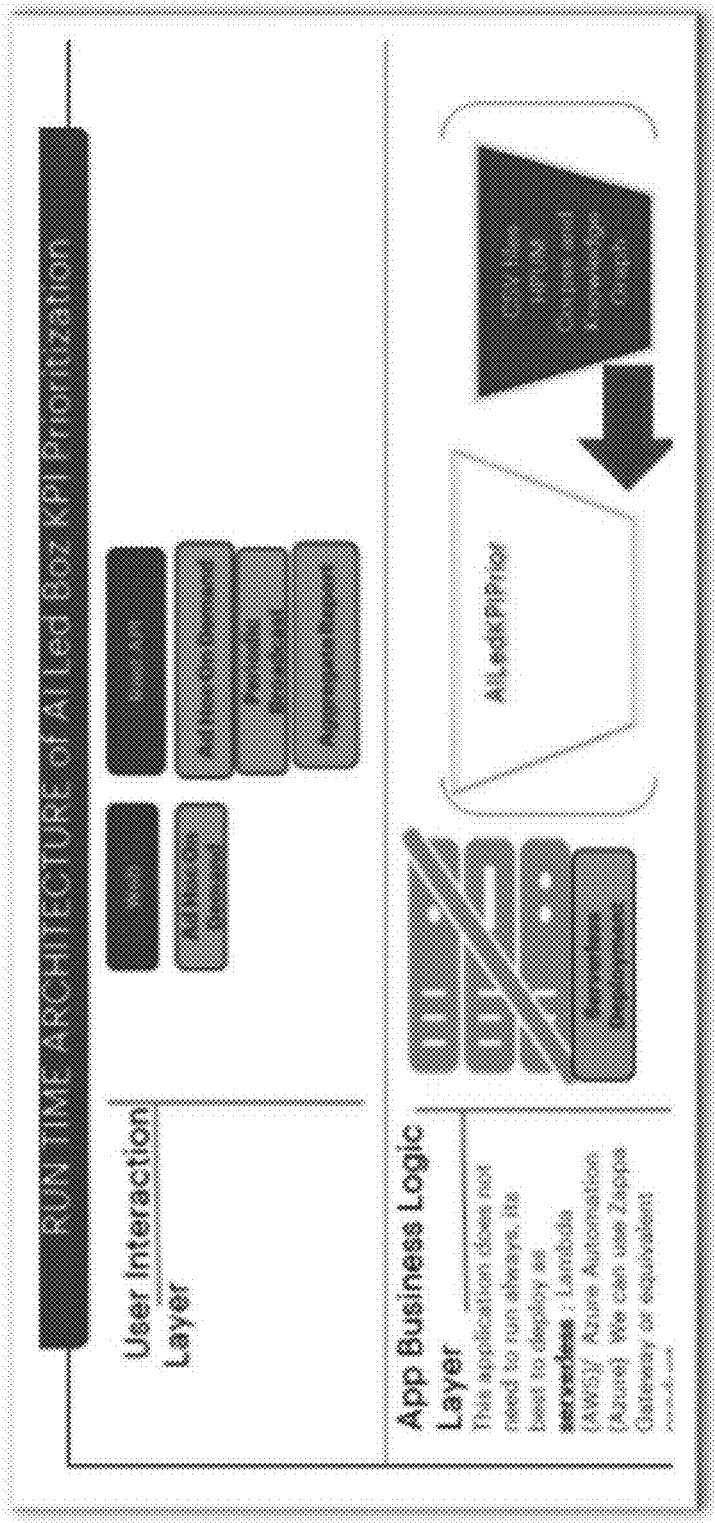
FIG. 14 illustrates a Cloud based deployment of certain functionality of the artificial intelligence and machine learning based incident management apparatus of FIG. 1 in accordance with an example of the present disclosure.

FIG. 14 illustrates a Cloud based deployment of certain functionality of the apparatus 100 in accordance with an example of the present disclosure.

Referring to FIG. 14, certain functionalities of the apparatus 100 may be deployed on different types of platforms. For example, the apparatus 100 may be deployed on premise at an organization, in a private cloud environment, or on a public cloud environment.

Referring again to FIG. 1, input data to the apparatus 100 may include new data to be made available at a specific time, for example, from a service management database. The input data may be filtered on a specified date, and pushed to a specified location (e.g., a storage bucket). The graph database may be refreshed only when it is needed to be changed.

With respect to extraction-load-transform, certain functionality of the apparatus 100 may include loading of the daily data (e.g., the incident data 104, and/or the incident data 128) to the machine learning classification model 118 for KPI prioritization, and launching via a serverless mechanism on a specific time (e.g., end-of-day). Further, the incident data preprocessor 112 with respect to block 202 may be launched on the loaded data to perform the associated transform for the extraction-load-transform operation.

Figure 15:
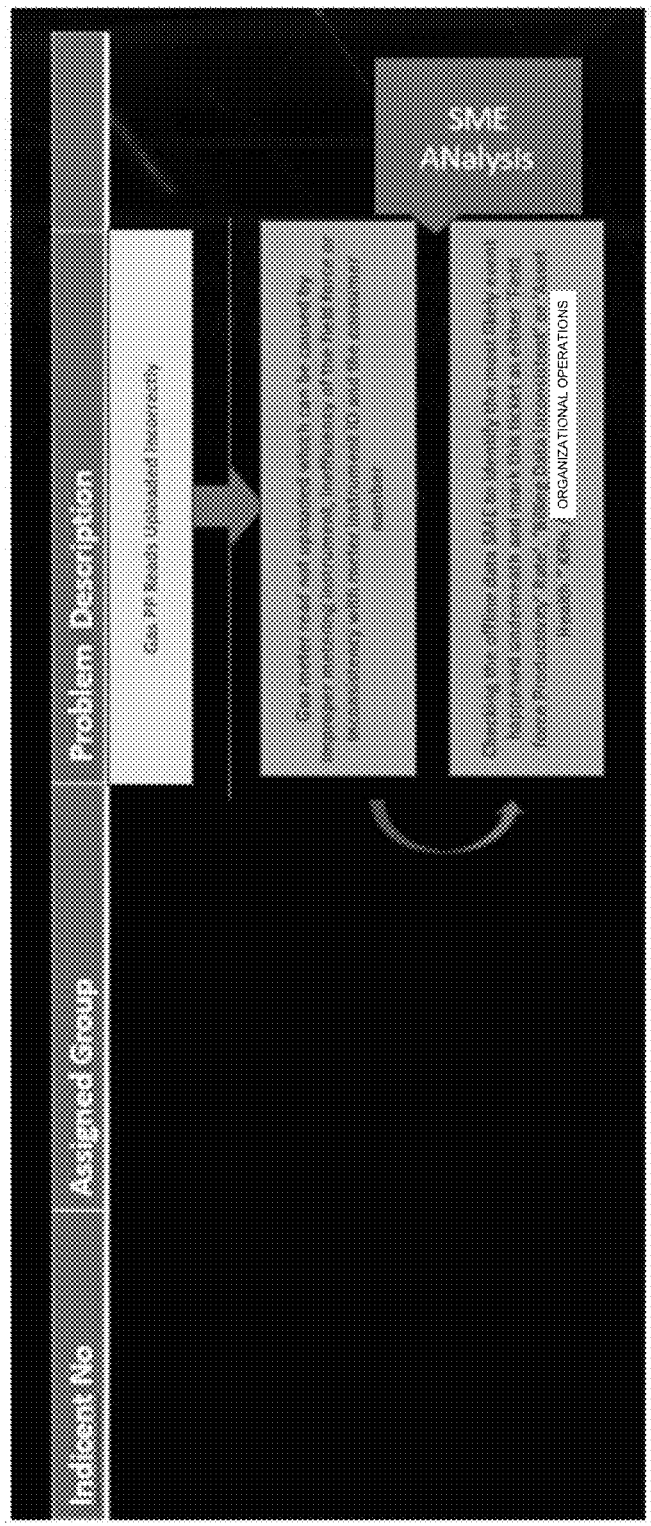
FIG. 15 illustrates labelling of an incident for supervised learning for the artificial intelligence and machine learning based incident management apparatus of FIG. 1 in accordance with an example of the present disclosure.

FIG. 15 illustrates labelling of an incident for supervised learning for the apparatus 100 in accordance with an example of the present disclosure.

Referring to FIG. 15, a subject matter expert may label a plurality of incidents for supervised learning. For example, for a problem description that indicates that "Gas PP Reads Uploaded Incorrectly", a subject matter expert analysis may be used to label such an incident as "gas meter read not uploaded which can be caused by improper metering instrument, inefficiency of the field force or inconsistency with meter instrument ID and the consumer number", and "checking the off-line data SME to identify the most likely event happened underneath and mark this ticket as either "Field force Productivity Rate", "Billing Data Inconsistent" or "Asset Health" KPIs/Organizational operations".

Figure 16:
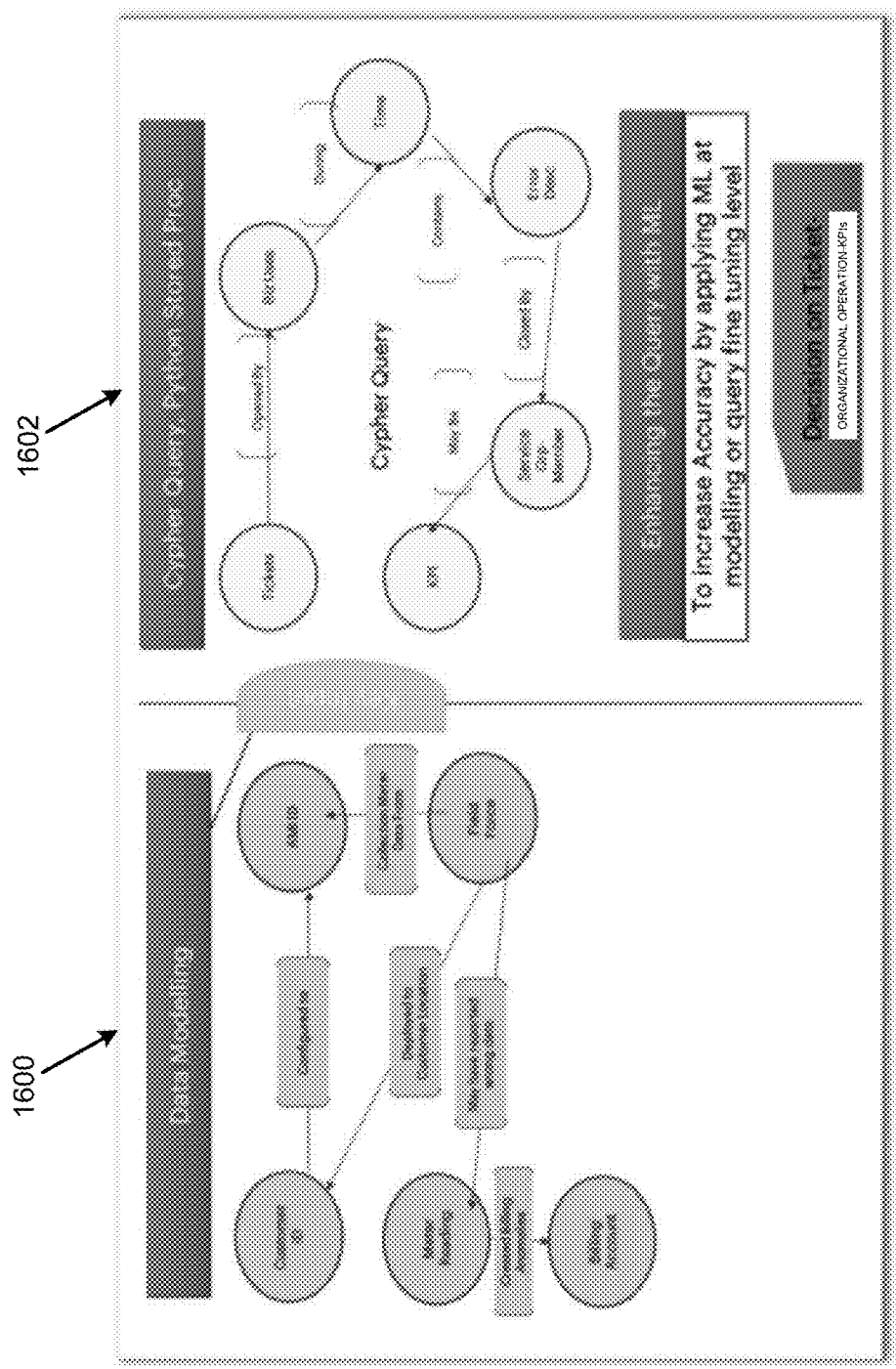
FIG. 16 illustrates an industry knowledge graph to illustrate operation of the artificial intelligence and machine learning based incident management apparatus of FIG. 1 in accordance with an example of the present disclosure.

FIG. 16 illustrates an industry knowledge graph to illustrate operation of the apparatus 100 in accordance with an example of the present disclosure.

Referring to FIG. 16, data modeling is illustrated at 1600, and cypher query/Python stored processing is illustrated at 1602.

Figure 17:
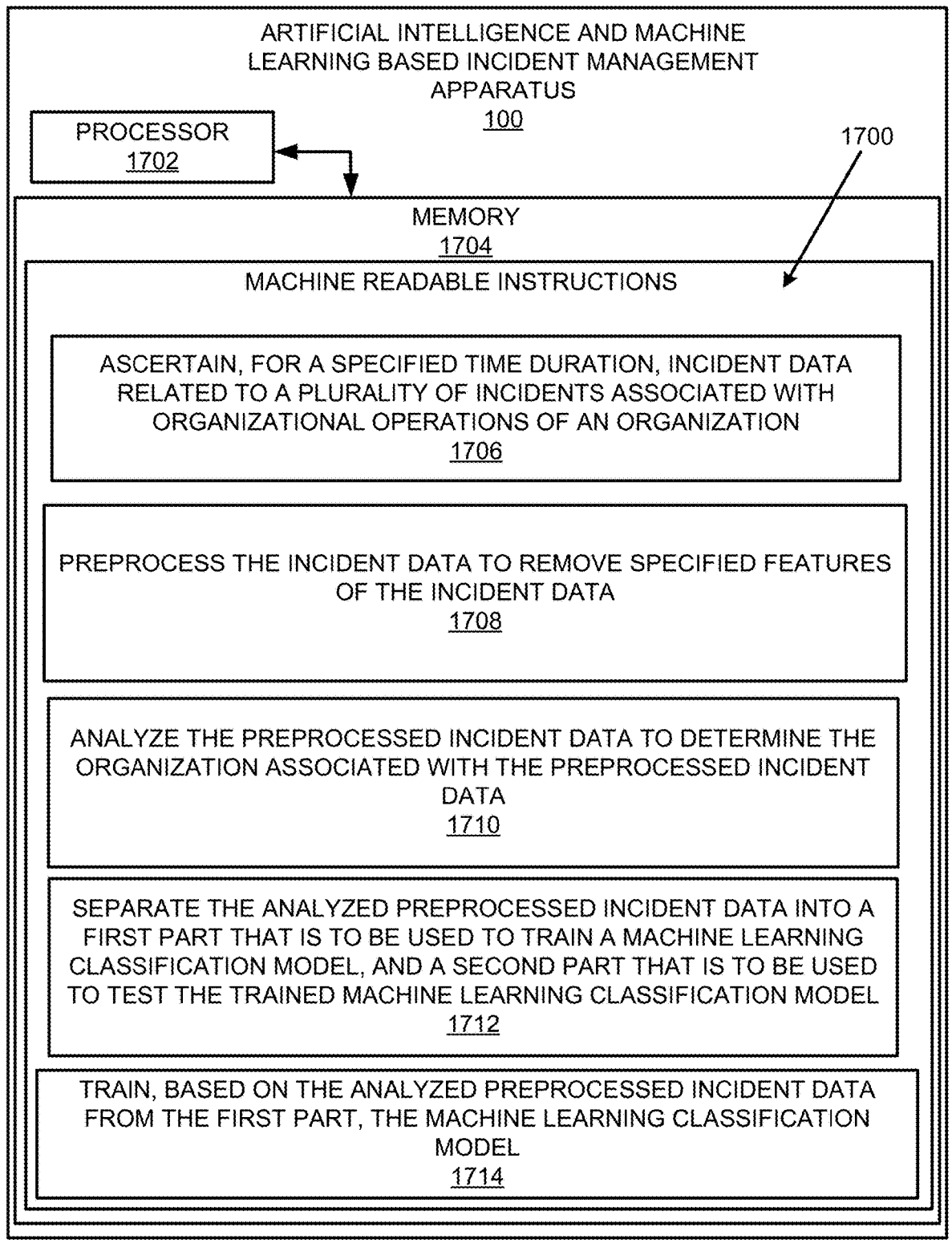
FIG. 17 illustrates an example block diagram for artificial intelligence and machine learning based incident management in accordance with an example of the present disclosure.
Figure 17:
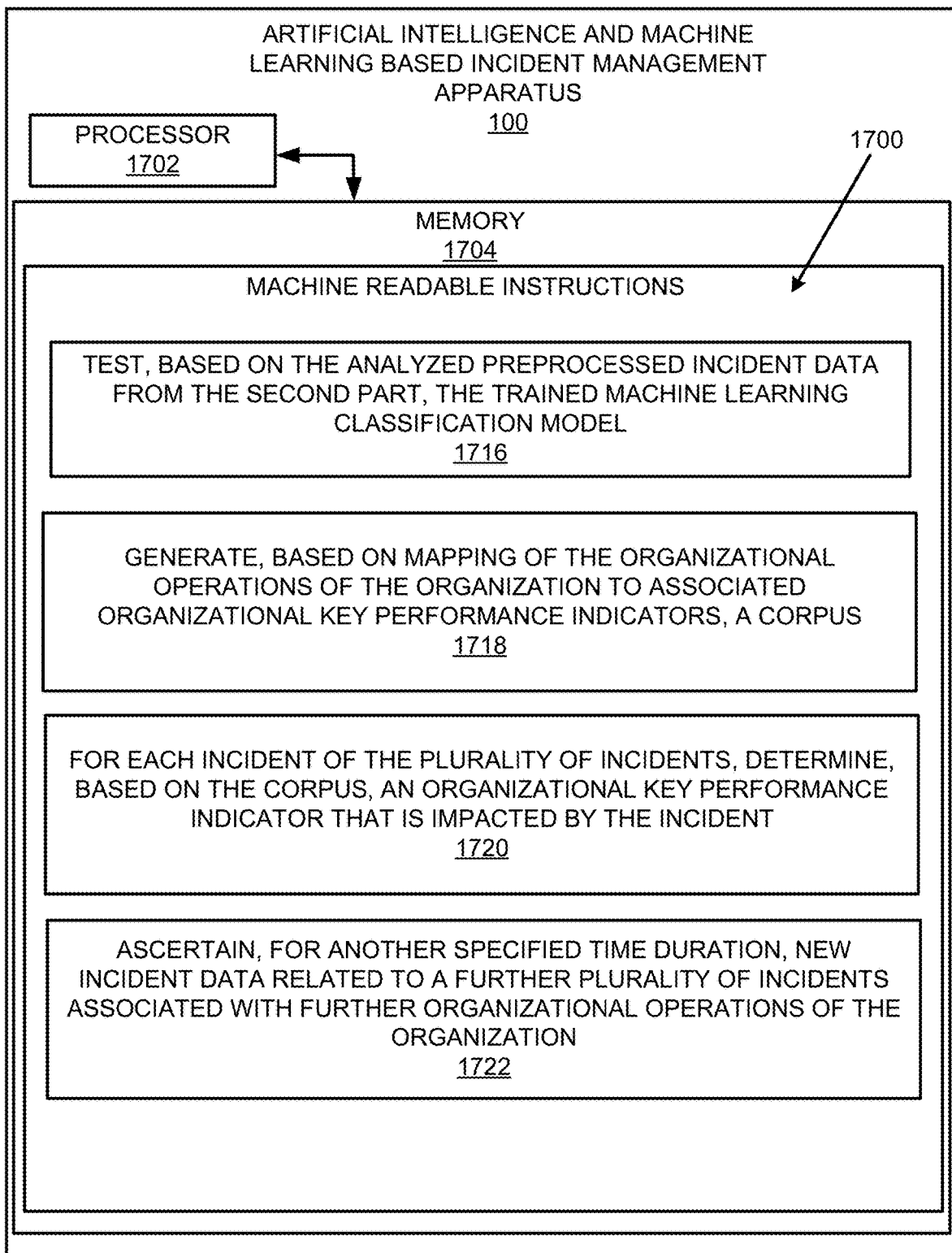
Figure 17:
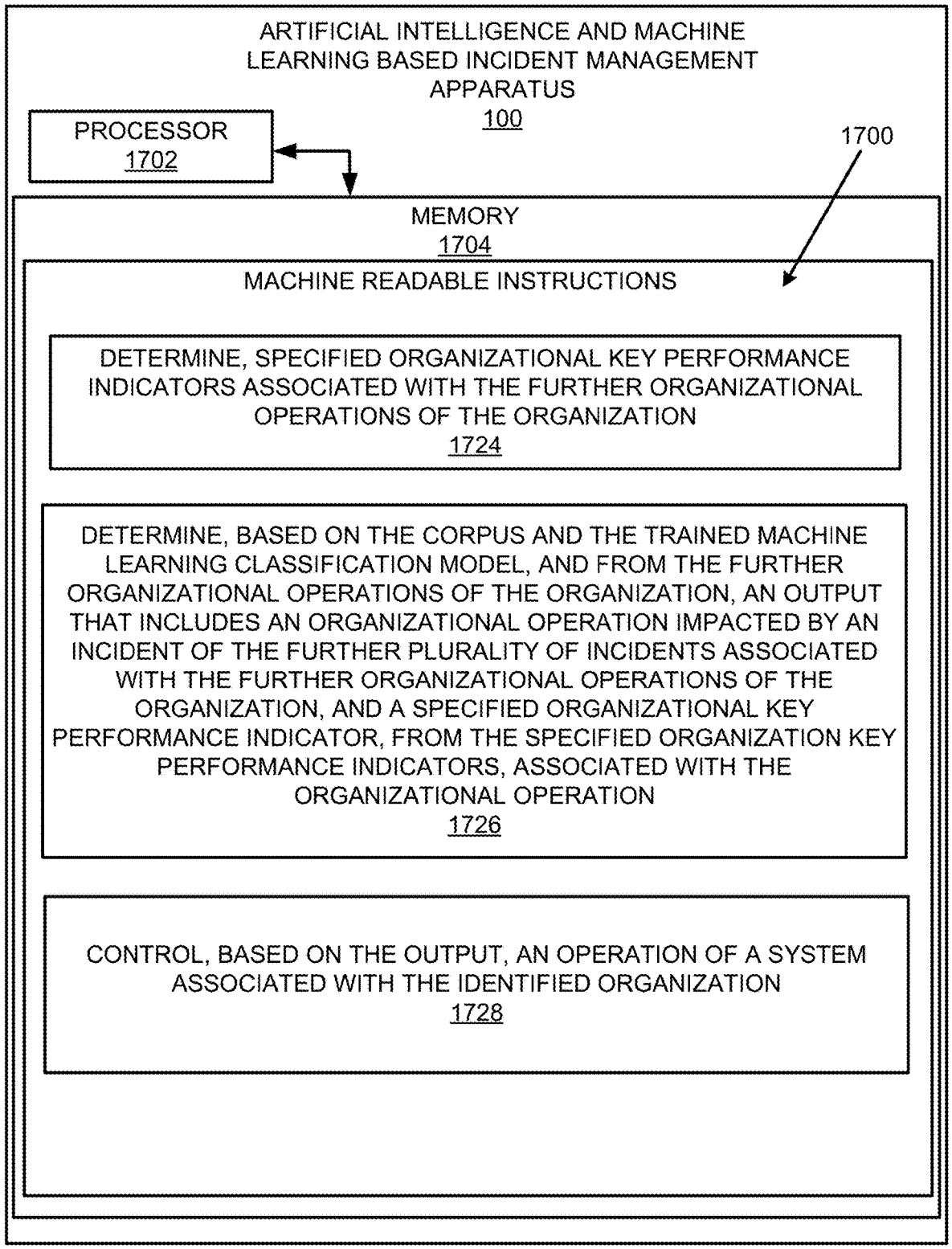
Figure 19:
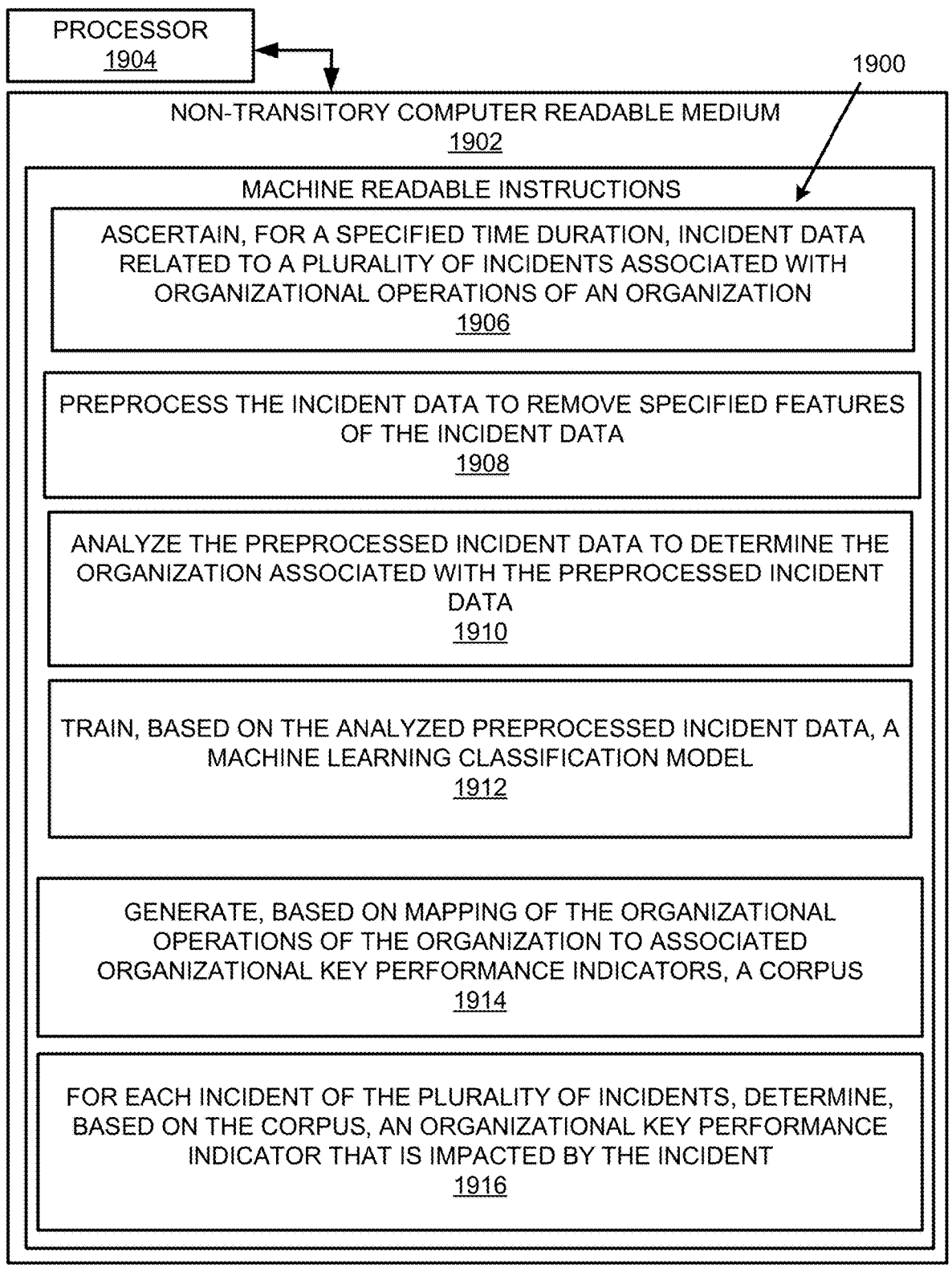
FIG. 19 illustrates a further example block diagram for artificial intelligence and machine learning based incident management in accordance with another example of the present disclosure.
Figure 19:
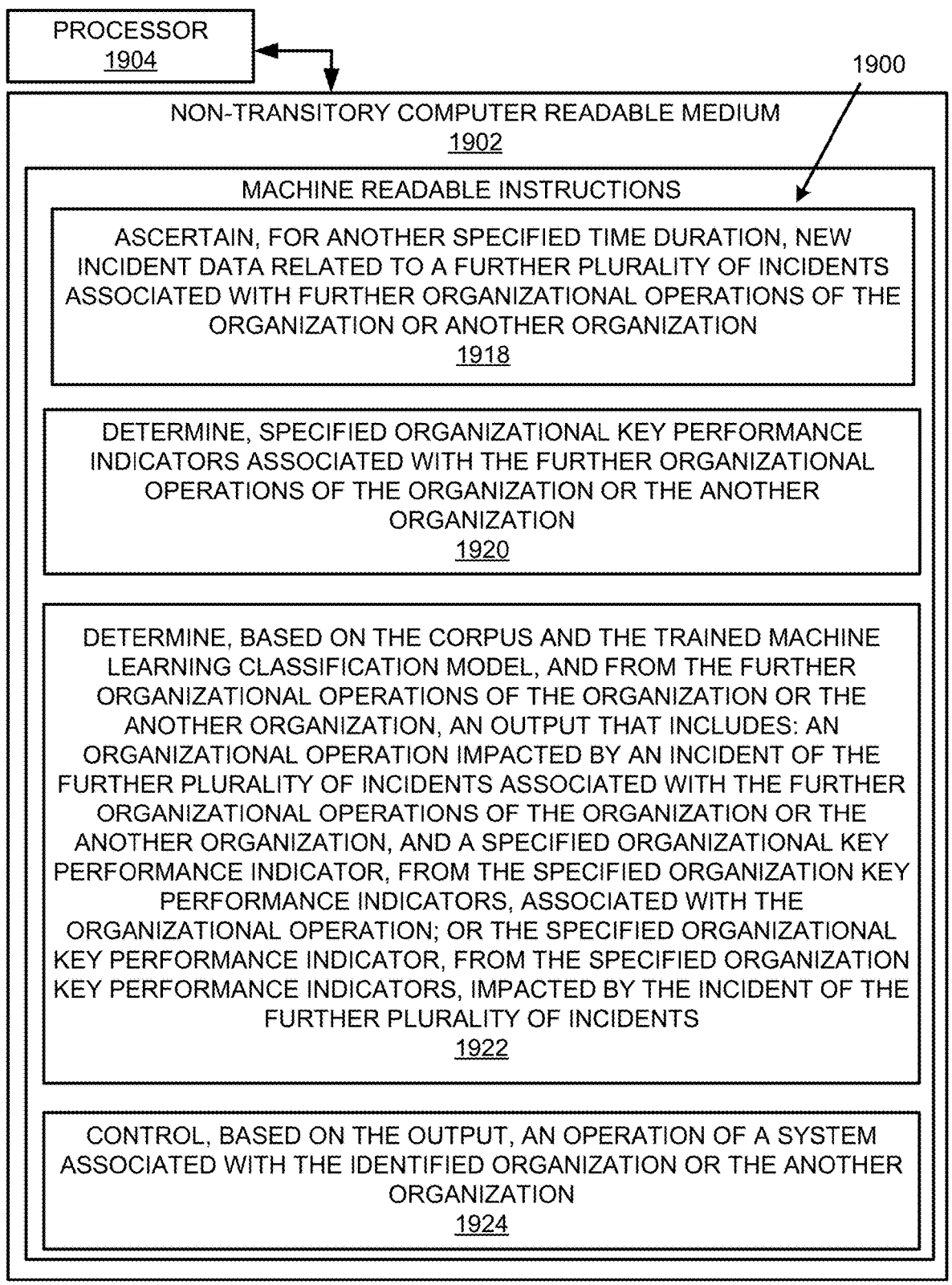

FIGS. 17-19 respectively illustrate an example block diagram 1700, a flowchart of an example method 1800, and a further example block diagram 1900 for artificial intelligence and machine learning based incident management, according to examples. The block diagram 1700, the method 1800, and the block diagram 1900 may be implemented on the apparatus 100 described above with reference to FIG. 1 by way of example and not of limitation. The block diagram 1700, the method 1800, and the block diagram 1900 may be practiced in other apparatus. In addition to showing the block diagram 1700, FIG. 17 shows hardware of the apparatus 100 that may execute the instructions of the block diagram 1700. The hardware may include a processor 1702, and a memory 1704 storing machine readable instructions that when executed by the processor cause the processor to perform the instructions of the block diagram 1700. The memory 1704 may represent a non-transitory computer readable medium. FIG. 18 may represent an example method for artificial intelligence and machine learning based incident management, and the steps of the method. FIG. 19 may represent a non-transitory computer readable medium 1902 having stored thereon machine readable instructions to provide artificial intelligence and machine learning based incident management according to an example. The machine readable instructions, when executed, cause a processor 1904 to perform the instructions of the block diagram 1900 also shown in FIG. 19.

The processor 1702 of FIG. 17 and/or the processor 1904 of FIG. 19 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1902 of FIG. 19), such as hardware storage devices (e.g., RAM (random access memory), ROM (read only memory), EPROM (erasable, programmable ROM), EEPROM (electrically erasable, programmable ROM), hard drives, and flash memory). The memory 1704 may include a RAM, where the machine readable instructions and data for a processor may reside during runtime.

Referring to FIGS. 1-17, and particularly to the block diagram 1700 shown in FIG. 17, the memory 1704 may include instructions 1706 to ascertain, for a specified time duration, incident data 104 related to a plurality of incidents 106 associated with organizational operations 108 of an organization 110.

The processor 1702 may fetch, decode, and execute the instructions 1708 to preprocess the incident data 104 to remove specified features of the incident data 104.

The processor 1702 may fetch, decode, and execute the instructions 1710 to analyze the preprocessed incident data to determine the organization 110 associated with the preprocessed incident data.

The processor 1702 may fetch, decode, and execute the instructions 1712 to separate the analyzed preprocessed incident data into a first part that is to be used to train a machine learning classification model 118, and a second part that is to be used to test the trained machine learning classification model 118.

The processor 1702 may fetch, decode, and execute the instructions 1714 to train, based on the analyzed preprocessed incident data from the first part, the machine learning classification model 118.

The processor 1702 may fetch, decode, and execute the instructions 1716 to test, based on the analyzed preprocessed incident data from the second part, the trained machine learning classification model 118.

The processor 1702 may fetch, decode, and execute the instructions 1718 to generate, based on mapping of the organizational operations 108 of the organization 110 to associated organizational key performance indicators 122, a corpus 124.

For each incident of the plurality of incidents 106, the processor 1702 may fetch, decode, and execute the instructions 1720 to determine, based on the corpus 124, an organizational key performance indicator that is impacted by the incident.

The processor 1702 may fetch, decode, and execute the instructions 1722 to ascertain, for another specified time duration, new incident data 128 related to a further plurality of incidents 130 associated with further organizational operations 132 of the organization 110.

The processor 1702 may fetch, decode, and execute the instructions 1724 to determine specified organizational key performance indicators 134 associated with the further organizational operations 132 of the organization 110.

The processor 1702 may fetch, decode, and execute the instructions 1726 to determine, based on the corpus 124 and the trained machine learning classification model 118, and from the further organizational operations 132 of the organization 110, an output 136 that includes an organizational operation impacted by an incident of the further plurality of incidents 130 associated with the further organizational operations 132 of the organization 110, and a specified organizational key performance indicator, from the specified organization key performance indicators 134, associated with the organizational operation.

The processor 1702 may fetch, decode, and execute the instructions 1728 to control, based on the output 136, an operation of a system 140 associated with the identified organization 110.

Referring to FIGS. 1-18 and 18, and particularly FIG. 18, for the method 1800, at block 1802, the method may include ascertaining, for a specified time duration, incident data 104 related to a plurality of incidents 106 associated with organizational operations 108 of an organization 110.

At block 1804, the method may include preprocessing the incident data 104 to remove specified features of the incident data 104.

At block 1806, the method may include analyzing the preprocessed incident data to determine the organization 110 associated with the preprocessed incident data.

At block 1808, the method may include separating the analyzed preprocessed incident data into a first part that is to be used to train a machine learning classification model 118, and a second part that is to be used to test the trained machine learning classification model 118.

At block 1810, the method may include training, based on the analyzed preprocessed incident data from the first part, the machine learning classification model 118.

At block 1812, the method may include testing, based on the analyzed preprocessed incident data from the second part, the trained machine learning classification model 118.

At block 1814, the method may include ascertaining, for another specified time duration, new incident data 128 related to a further plurality of incidents 130 associated with further organizational operations 132 of the organization 110.

At block 1816, the method may include determining specified organizational key performance indicators 134 associated with the further organizational operations 132 of the organization 110.

At block 1818, the method may include determining, based on the trained machine learning classification model 118, and from the further organizational operations 132 of the organization 110, an output 136 that includes a specified organizational key performance indicator, from the specified organization key performance indicators 134, impacted by an incident of the further plurality of incidents.

At block 1820, the method may include controlling, based on the output 136, an operation of a system 140 associated with the identified organization 110.

Referring to FIGS. 1-18 and 19, and particularly FIG. 19, for the block diagram 1900, the non-transitory computer readable medium 1902 may include instructions 1906 to ascertain, for a specified time duration, incident data 104 related to a plurality of incidents 106 associated with organizational operations 108 of an organization 110.

The processor 1904 may fetch, decode, and execute the instructions 1908 to preprocess the incident data 104 to remove specified features of the incident data 104.

The processor 1904 may fetch, decode, and execute the instructions 1910 to analyze the preprocessed incident data to determine the organization 110 associated with the preprocessed incident data.

The processor 1904 may fetch, decode, and execute the instructions 1912 to train, based on the analyzed preprocessed incident data, a machine learning classification model 118.

The processor 1904 may fetch, decode, and execute the instructions 1914 to generate, based on mapping of the organizational operations 108 of the organization 110 to associated organizational key performance indicators 122, a corpus 124.

For each incident of the plurality of incidents 106, the processor 1904 may fetch, decode, and execute the instructions 1916 to determine, based on the corpus 124, an organizational key performance indicator that is impacted by the incident.

The processor 1904 may fetch, decode, and execute the instructions 1918 to ascertain, for another specified time duration, new incident data 128 related to a further plurality of incidents 130 associated with further organizational operations 132 of the organization 110 or another organization.

The processor 1904 may fetch, decode, and execute the instructions 1920 to determine specified organizational key performance indicators 134 associated with the further organizational operations 132 of the organization 110 or the another organization.

The processor 1904 may fetch, decode, and execute the instructions 1922 to determine, based on the corpus 124 and the trained machine learning classification model 118, and from the further organizational operations 132 of the organization 110 or the another organization, an output 136 that includes an organizational operation impacted by an incident of the further plurality of incidents 130 associated with the further organizational operations 132 of the organization 110 or the another organization, and a specified organizational key performance indicator, from the specified organization key performance indicators 134, associated with the organizational operation, or the specified organizational key performance indicator, from the specified organization key performance indicators 134, impacted by the incident of the further plurality of incidents.

The processor 1904 may fetch, decode, and execute the instructions 1924 to control, based on the output 136, an operation of a system 140 associated with the identified organization 110 or the another organization.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An artificial intelligence and machine learning based incident management apparatus comprising:
   an incident data receiver, executed by at least one hardware processor, to
      ascertain, for a specified time duration, incident data related to a plurality of incidents associated with organizational operations of an organization;
   an incident data preprocessor, executed by the at least one hardware processor, to
      preprocess the incident data to remove specified features of the incident data;
   an incident data analyzer, executed by the at least one hardware processor, to
      analyze the preprocessed incident data to determine the organization associated with the preprocessed incident data;
   a classification model generator, executed by the at least one hardware processor, to
      separate the analyzed preprocessed incident data into a first part that is to be used to train a machine learning classification model, and a second part that is to be used to test the trained machine learning classification model,
      train, based on the analyzed preprocessed incident data from the first part, the machine learning classification model, and
      test, based on the analyzed preprocessed incident data from the second part, the trained machine learning classification model by
         determining, for the trained machine learning classification model, a precision score, and
         based on a determination that the precision score is less than a specified precision score threshold, iteratively training the machine learning model until the precision score is greater than or equal to the specified precision score threshold;
   a corpus generator, executed by the at least one hardware processor, to
      generate, based on mapping of the organizational operations of the organization to associated organizational key performance indicators, a corpus, and
      for each incident of the plurality of incidents, determine, based on the corpus, an organizational key performance indicator that is impacted by the incident;
   an output generator, executed by the at least one hardware processor, to
      ascertain, for another specified time duration, new incident data related to a further plurality of incidents associated with further organizational operations of the organization,
      determine, specified organizational key performance indicators associated with the further organizational operations of the organization, and
      determine, based on the corpus and the trained machine learning classification model, and from the further organizational operations of the organization, an output that includes an organizational operation impacted by an incident of the further plurality of incidents associated with the further organizational operations of the organization, and a specified organizational key performance indicator, from the specified organization key performance indicators, associated with the organizational operation; and
   an organizational operation controller, executed by the at least one hardware processor, to
      control, based on the output, an operation of a hardware system associated with the identified organization.

2. The apparatus according to claim 1, wherein the specified time duration is different from the another specified time duration.

3. The apparatus according to claim 1, wherein the incident data preprocessor is executed by the at least one hardware processor to preprocess the incident data to remove the specified features of the incident data by:
   removing the specified features that include at least one of specified characters, specified words, or specified phrases.

4. The apparatus according to claim 1, wherein the incident data preprocessor is executed by the at least one hardware processor to:
   classify, based on a quality of the incident data, the incident data as mature or naïve; and based on the naïve classification of the incident data, utilize deep learning to extract features from the incident data.

5. The apparatus according to claim 1, wherein the corpus generator is executed by the at least one hardware processor to generate, based on mapping of the organizational operations of the organization to associated organizational key performance indicators, the corpus by:
   utilizing an ontology to map relationships between the organizational operations of the organization and the associated organizational key performance indicators; and
   generating, based on the mapping of the organizational operations of the organization to the associated organizational key performance indicators, the corpus.

6. The apparatus according to claim 1, wherein the output generator is executed by the at least one hardware processor to:
   determine a priority of each incident of the further plurality of incidents; and
   modify, based on the determined priority of each incident of the further plurality of incidents, the priority of the incident corresponding to the impacted organizational operation.

7. The apparatus according to claim 6, wherein the output generator is executed by the at least one hardware processor to modify, based on the determined priority of each incident of the further plurality of incidents, the priority of the incident corresponding to the impacted organizational operation by:
   increasing the priority of the incident corresponding to the impacted organizational operation.

8. A method for artificial intelligence and machine learning based incident management, the method comprising:
   ascertaining, by at least one hardware processor and for a specified time duration, incident data related to a plurality of incidents associated with organizational operations of an organization;
   preprocessing, by the at least one hardware processor, the incident data to remove specified features of the incident data;
   analyzing, by the at least one hardware processor, the preprocessed incident data to determine the organization associated with the preprocessed incident data;
   separating, by the at least one hardware processor, the analyzed preprocessed incident data into a first part that is to be used to train a machine learning classification model, and a second part that is to be used to test the trained machine learning classification model;
   training, by the at least one hardware processor and based on the analyzed preprocessed incident data from the first part, the machine learning classification model;
   testing, by the at least one hardware processor and based on the analyzed preprocessed incident data from the second part, the trained machine learning classification model by
      determining, for the trained machine learning classification model, a precision score, and
      based on a determination that the precision score is less than a specified precision score threshold, iteratively training the machine learning model until the precision score is greater than or equal to the specified precision score threshold;
   ascertaining, by the at least one hardware processor, for another specified time duration, new incident data related to a further plurality of incidents associated with further organizational operations of the organization;
   determining, by the at least one hardware processor, specified organizational key performance indicators associated with the further organizational operations of the organization;
   determining, by the at least one hardware processor, based on the trained machine learning classification model, and from the further organizational operations of the organization, an output that includes a specified organizational key performance indicator, from the specified organization key performance indicators, impacted by an incident of the further plurality of incidents; and
   controlling, by the at least one hardware processor and based on the output, an operation of a hardware system associated with the identified organization.

9. The method according to claim 8, wherein the specified time duration is different from the another specified time duration.

10. The method according to claim 8, wherein preprocessing, by the at least one hardware processor, the incident data to remove the specified features of the incident data further comprises:
    removing the specified features that include at least one of specified characters, specified words, or specified phrases.

11. The method according to claim 8, further comprising:
    classifying, by the at least one hardware processor and based on a quality of the incident data, the incident data as mature or naïve; and
    based on the naïve classification of the incident data, utilizing, by the at least one hardware processor, deep learning to extract features from the incident data.

12. The method according to claim 8, further comprising:
    determining, by the at least one hardware processor, a priority of each incident of the further plurality of incidents; and
    modifying, by the at least one hardware processor and based on the determined priority of each incident of the further plurality of incidents, the priority of the incident corresponding to the impacted specified organizational key performance indicator.

13. The method according to claim 12, wherein modifying, by the at least one hardware processor and based on the determined priority of each incident of the further plurality of incidents, the priority of the incident corresponding to the impacted specified organizational key performance indicator further comprises:
    increasing the priority of the incident corresponding to the impacted specified organizational key performance indicator.

14. A non-transitory computer readable medium having stored thereon machine readable instructions, the machine readable instructions, when executed by at least one hardware processor, cause the at least one hardware processor to:
    ascertain, for a specified time duration, incident data related to a plurality of incidents associated with organizational operations of an organization;
    preprocess the incident data to remove specified features of the incident data;
    analyze the preprocessed incident data to determine the organization associated with the preprocessed incident data;
    separate the analyzed preprocessed incident data into a first part that is to be used to train a machine learning classification model, and a second part that is to be used to test the trained machine learning classification model;

train, based on the analyzed preprocessed incident data from the first part, the machine learning classification model;
test, based on the analyzed preprocessed incident data from the second part, the trained machine learning classification model by
  determining, for the trained machine learning classification model, a precision score, and
  based on a determination that the precision score is less than a specified precision score threshold, iteratively training the machine learning model until the precision score is greater than or equal to the specified precision score threshold;
generate, based on mapping of the organizational operations of the organization to associated organizational key performance indicators, a corpus;
for each incident of the plurality of incidents, determine, based on the corpus, an organizational key performance indicator that is impacted by the incident;
ascertain, for another specified time duration, new incident data related to a further plurality of incidents associated with further organizational operations of the organization or another organization;
determine, specified organizational key performance indicators associated with the further organizational operations of the organization or the another organization;
determine, based on the corpus and the trained machine learning classification model, and from the further organizational operations of the organization or the another organization, an output that includes:
  an organizational operation impacted by an incident of the further plurality of incidents associated with the further organizational operations of the organization or the another organization, and a specified organizational key performance indicator, from the specified organization key performance indicators, associated with the organizational operation; or
  the specified organizational key performance indicator, from the specified organization key performance indicators impacted by the incident of the further plurality of incidents; and
control, based on the output, an operation of a hardware system associated with the identified organization or the another organization.

15. The non-transitory computer readable medium according to claim 14, wherein the machine readable instructions, when executed by the at least one hardware processor, further cause the at least one hardware processor to:
  classify, based on a quality of the incident data ascertained for the specified time duration, the incident data as mature or naïve; and
  based on the naïve classification of the incident data, utilize deep learning to extract features from the incident data.

16. The non-transitory computer readable medium according to claim 14, wherein the machine readable instructions, when executed by the at least one hardware processor, further cause the at least one hardware processor to:
  determine a priority of each incident of the further plurality of incidents; and
  modify, based on the determined priority of each incident of the further plurality of incidents, the priority of the incident corresponding to the impacted organizational operation or the impacted specified organizational key performance indicator.

17. The non-transitory computer readable medium according to claim 16, wherein the machine readable instructions to modify, based on the determined priority of each incident of the further plurality of incidents, the priority of the incident corresponding to the impacted organizational operation or the impacted specified organizational key performance indicator, when executed by the at least one hardware processor, further cause the at least one hardware processor to:
  increase the priority of the incident corresponding to the impacted organizational operation or the impacted specified organizational key performance indicator.

18. The non-transitory computer readable medium according to claim 14, wherein the machine readable instructions to generate, based on mapping of the organizational operations of the organization to associated organizational key performance indicators, the corpus, when executed by the at least one hardware processor, further cause the at least one hardware processor to:
  utilize an ontology to map relationships between the organizational operations of the organization and the associated organizational key performance indicators; and
  generate, based on the mapping of the organizational operations of the organization to the associated organizational key performance indicators, the corpus.

* * * * *